US010633095B2

(12) United States Patent
Asao et al.

(10) Patent No.: US 10,633,095 B2
(45) Date of Patent: Apr. 28, 2020

(54) IMAGING SYSTEM, VIDEO PROCESSING SYSTEM, AND VIDEO PROCESSING METHOD

(71) Applicant: Panasonic Intellectual Property Management Co., Ltd., Osaka-shi, Osaka (JP)

(72) Inventors: Yoshifumi Asao, Hyogo (JP); Masaharu Matsumoto, Osaka (JP); Keijiroh Nagano, Osaka (JP); Masaaki Higashida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 47 days.

(21) Appl. No.: 15/385,885

(22) Filed: Dec. 21, 2016

(65) Prior Publication Data
US 2017/0289463 A1    Oct. 5, 2017

Related U.S. Application Data

(60) Provisional application No. 62/317,637, filed on Apr. 4, 2016.

(51) Int. Cl.
*B64D 47/08* (2006.01)
*B64D 11/00* (2006.01)
*H04N 7/18* (2006.01)

(52) U.S. Cl.
CPC .......... *B64D 11/0015* (2013.01); *B64D 47/08* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 5,440,337 A | 8/1995 | Henderson et al. | |
| 2004/0208497 A1 | 10/2004 | Seger et al. | |
| 2007/0257928 A1 | 11/2007 | Marks et al. | |
| 2010/0283837 A1 | 11/2010 | Oohchida et al. | |
| 2011/0141379 A1 | 6/2011 | Ichioka et al. | |
| 2012/0113149 A1 | 5/2012 | Tanabe | |
| 2012/0293693 A1* | 11/2012 | Sumitomo | H04N 13/221 348/246 |
| 2014/0176726 A1* | 6/2014 | Millward | H04N 5/23238 348/169 |

(Continued)

FOREIGN PATENT DOCUMENTS

| | | |
|---|---|---|
| JP | H07-196096 A | 8/1995 |
| JP | 2002-178997 A | 6/2002 |

(Continued)

*Primary Examiner* — Christopher G Findley
(74) *Attorney, Agent, or Firm* — Shinjyu Global IP

(57) ABSTRACT

An imaging system includes a first imaging device and a second imaging device disposed flanking the main wing of an aircraft. The first imaging device and the second imaging device are disposed so that at least part of a first imaging range of the first imaging device overlaps a second imaging range of the second imaging device. The first imaging device and the second imaging device are also disposed so that the first imaging range and the second imaging range overlap an extension of the pitch axis of the aircraft and do not overlap the roll axis of the aircraft or an extension thereof.

14 Claims, 31 Drawing Sheets

(56) References Cited

U.S. PATENT DOCUMENTS

2015/0124060 A1    5/2015  Hasegawa et al.
2015/0353205 A1    12/2015 Nixon
2016/0325836 A1*   11/2016 Teo .................... B64D 11/0015

FOREIGN PATENT DOCUMENTS

| JP | 2003-087819 A | 3/2003 |
| JP | 2005-512876 A | 5/2005 |
| JP | 2010-261877 A | 11/2010 |
| JP | 2012-098621 A | 5/2012 |
| JP | 2013-109239 A | 6/2013 |
| WO | 2010/024005 A1 | 3/2010 |
| WO | 2013/165006 A1 | 11/2013 |

* cited by examiner

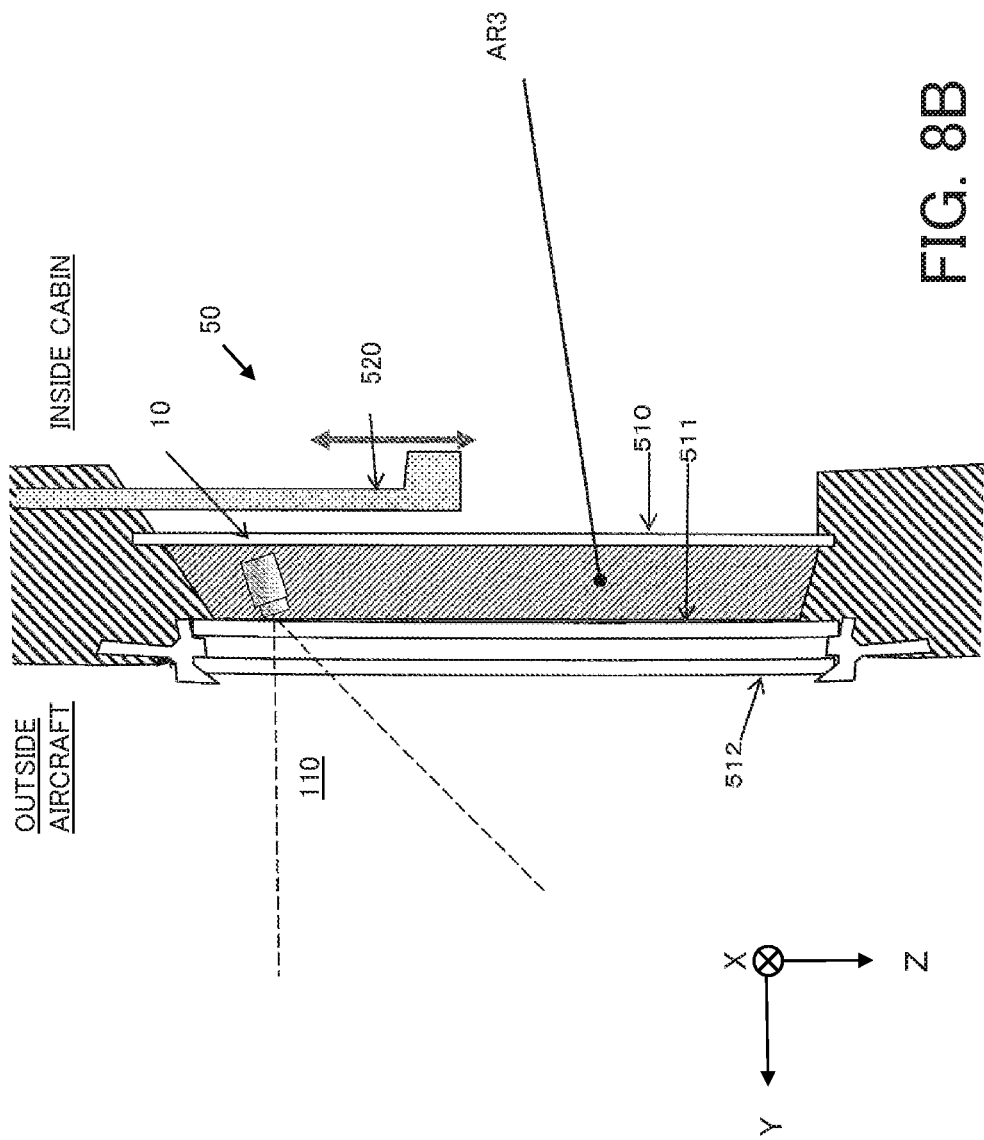

FIG. 25

STATE 1

| | CAMERA UNIT 412a | CAMERA UNIT 412b | CAMERA UNIT 412c | CAMERA UNIT 412d | CAMERA UNIT 412e | CAMERA UNIT 412f |
|---|---|---|---|---|---|---|
| STATUS | OK | OK | — | OK | OK | OK |
| VIDEO (SERVER SELECTION) | ○ | | | | | ○ |

FRONT OF AIRFRAME ← MAIN WING → REAR OF AIRFRAME

STATE 2

| | CAMERA UNIT 412a | CAMERA UNIT 412b | CAMERA UNIT 412c | CAMERA UNIT 412d | CAMERA UNIT 412e | CAMERA UNIT 412f |
|---|---|---|---|---|---|---|
| STATUS | Glass scratched | OK | — | OK | Clouds | White spots |
| VIDEO (SERVER SELECTION) | | ○ | | ○ | | |

FRONT OF AIRFRAME ← MAIN WING → REAR OF AIRFRAME

STATE 3

| | CAMERA UNIT 412a | CAMERA UNIT 412b | CAMERA UNIT 412c | CAMERA UNIT 412d | CAMERA UNIT 412e | CAMERA UNIT 412f |
|---|---|---|---|---|---|---|
| STATUS | Glass scratched | Clouds | — | OK | OK | OK |
| VIDEO (SERVER SELECTION) | | | | ○ | | ○ |

FRONT OF AIRFRAME ← MAIN WING → REAR OF AIRFRAME

IMAGING SYSTEM, VIDEO PROCESSING SYSTEM, AND VIDEO PROCESSING METHOD

CROSS-REFERENCE TO RELATED APPLICATIONS

This application claims benefit to U.S. provisional application No. 62/317,637, filed on Apr. 4, 2016. The entire disclosure of U.S. provisional application No. 62/317,637.

BACKGROUND

Technical Field

The present invention relates to an imaging system that is installed in an aircraft and mainly captures the view outside the aircraft, and to a video processing system and a video processing method thereof.

Description of the Related Art

There are known services with which a video of the runway during takeoff and landing, the view outside the aircraft, or the like can be viewed on an on-board display device by passengers in real time. Considerations such as aircraft safety or weight limits can sometimes impose restrictions on the camera installation location and the number of cameras.

SUMMARY

This disclosure provides an imaging system, a video processing system, and a video processing method that are effective at acquiring a good video of the outside of the aircraft, even in the restricted environment of an aircraft.

The imaging system disclosed herein comprises at least one imaging device that is installed in the airframe of an aircraft having a main wing. The imaging device is disposed so that an imaging range of the imaging device overlaps an extension of a pitch axis of the aircraft and does not overlap a roll axis of the aircraft and an extension thereof.

The video processing system disclosed herein comprises the above-mentioned imaging system and a control device configured to be connected to the imaging system. The at least one imaging device includes a plurality of imaging devices disposed flanking the main wing of the aircraft. The control device selects two or more of the imaging devices based on a specific condition, combines images from the two or more imaging devices that have been selected, and outputs the combined image.

The video processing method disclosed herein makes use of an imaging system including a plurality of imaging devices disposed in an airframe of an aircraft flanking a main wing of the aircraft, the imaging devices being disposed so that imaging ranges of the imaging devices overlap an extension of a pitch axis of the aircraft and do not overlap a roll axis of the aircraft or an extension thereof, said method comprising selecting two or more of the imaging devices based on a specific condition, combining images from the two or more imaging devices that have been selected, and outputting the combined image.

The imaging system, video processing system, and video processing method disclosed herein are effective at acquiring good video of the outside of the aircraft.

BRIEF DESCRIPTION OF DRAWINGS

FIG. 8B is a simplified view of the installation method when a camera is installed at a window equipped with a shade in Embodiment 4;

FIG. 25 is a simplified view of the imaging state and video selection when using a plurality of camera units in Embodiment 8;

DESCRIPTION OF EMBODIMENTS

Embodiments will now be described in detail through reference to the drawings as needed. However, unnecessarily detailed description may be omitted. For instance, detailed descriptions of things that are already well known, and redundant descriptions of components that are substantially the same may be omitted. The purpose of this is to avoid making the following description more wordy than necessary, and to facilitate understanding on the part of a person skilled in the art.

The appended drawings and the following description are provided so that a person skilled in the art might gain a thorough understanding, and are not intended to limit what is given in the patent claims.

In the examples that follow, the roll axis, pitch axis, and yaw axis, which pass through the center point of the airframe of the aircraft, shall be referred to respectively as the X axis, the Y axis, and the Z axis.

Also, in the following examples, a camera that is attached to a window of an aircraft may be referred to as either a camera or a camera unit.

Embodiment 1

In this embodiment, we will describe a means for optimizing the imaging range when capturing the view outside an aircraft.

Figure 1:
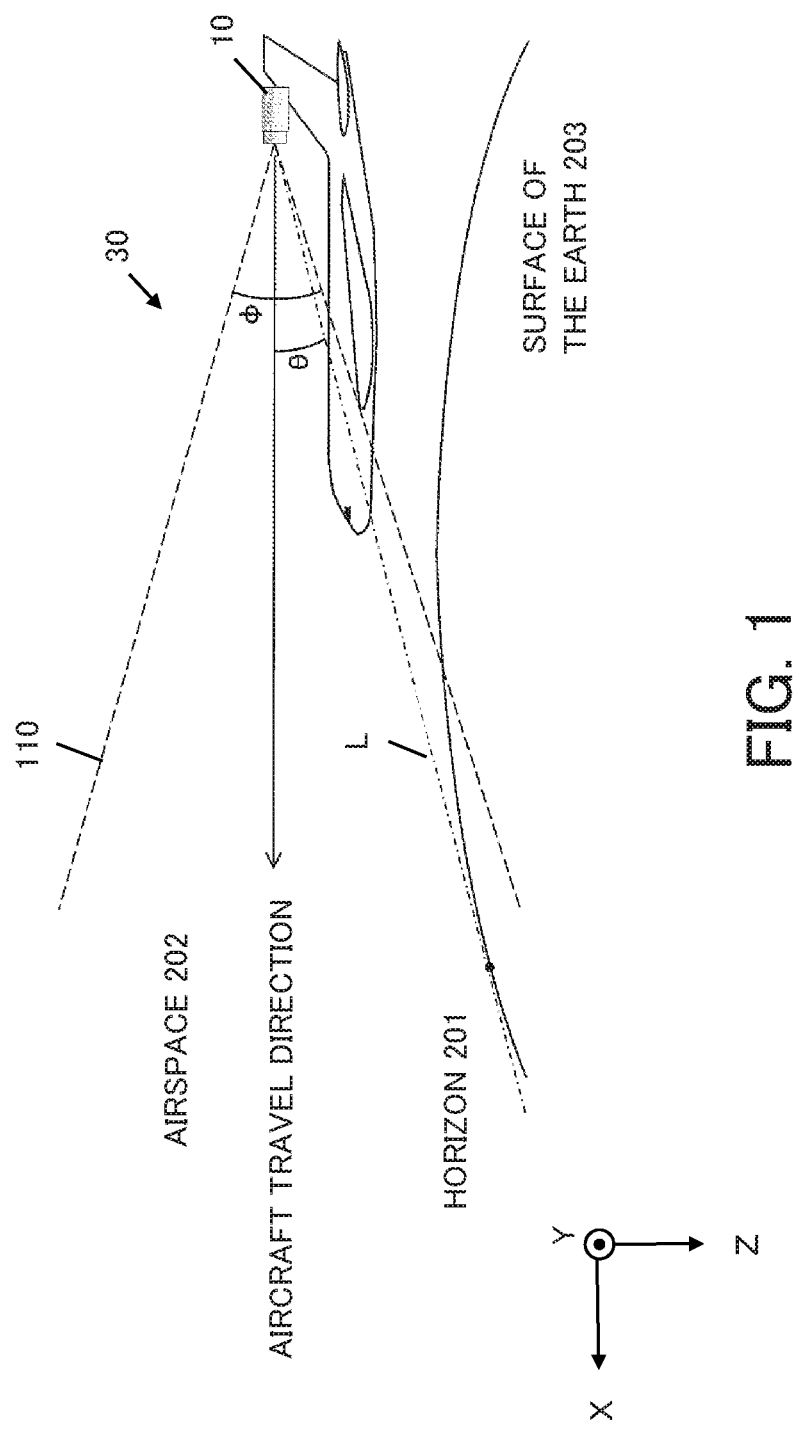
FIG. 1 is a simplified view of the positional relation between an aircraft and an outside view imaging camera in Embodiment 1.

FIG. 1 is a simplified view of the positional relation between an aircraft 30 and an outside view imaging camera 10 (an example of an imaging device). The angle of view of the camera 10 attached to the aircraft 30 is adjusted so that the horizon 201 will fall within an imaging range 110, which makes it possible to capture images of the airspace 202 (such as the sky or stars) and of the surface of the earth 203 (land or sea) at the same time. These captured images can be provided to passengers for their entertainment, whereby passengers can enjoy watching various patterns of images.

More specifically, the angle θ between the direction in which the aircraft is traveling along the X axis and a line L that links the camera 10 to the horizon 201 should be controlled to fall within the angle of view Φ of the camera. In particular, if the camera is attached facing in the direction of aircraft travel, the horizon can be captured within the angle of view by adjusting so as to satisfy θ<Φ/2.

Figure 2:
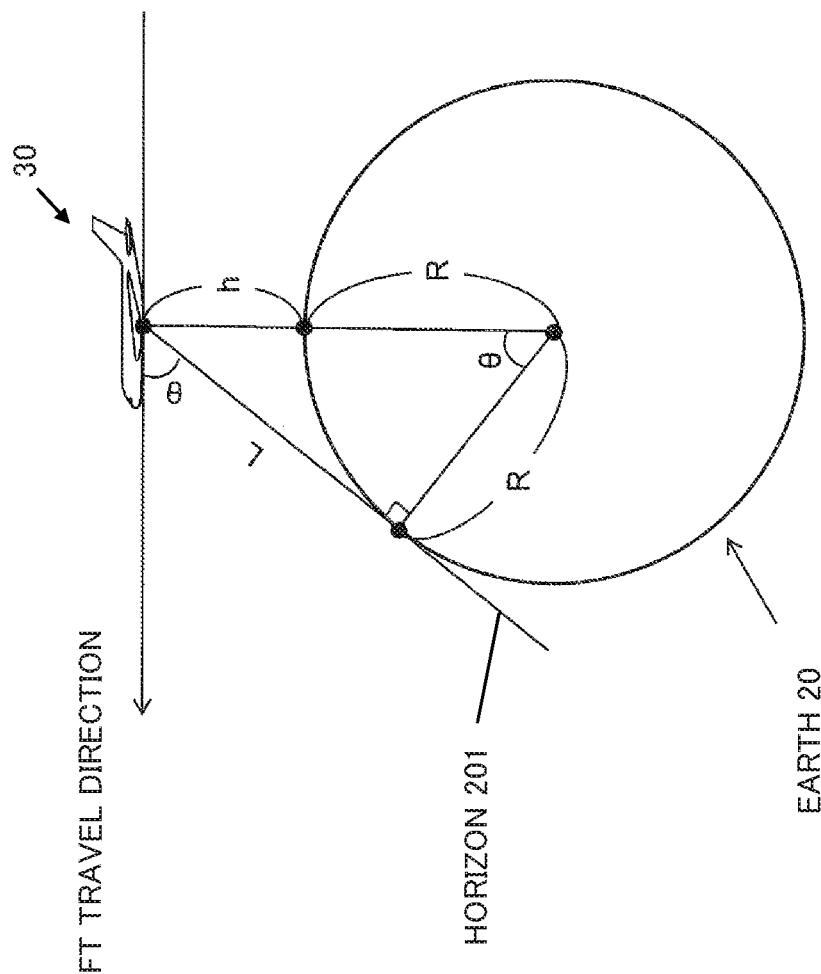
FIG. 2 is a simplified view of the positional relation between the aircraft in Embodiment 1 and the horizon.

The relation of the angle θ between the direction of aircraft travel and the line L linking the aircraft 30 and the horizon 201 will be described in further detail through reference to FIG. 2. In Formula 1 below, h is the altitude of the airplane and R is the radius of the earth.

$$\theta = \cos^{-1}(R/(h+R)) \qquad (1)$$

For example, if we let the radius R of the earth be 6378 kilometers (the radius at the equator) and the altitude h be 10,000 meters, then θ is approximately 3.2 degrees. By adjusting the angle of the camera 10 so that this range falls within the imaging range 110, the airspace 202 and the surface of the earth 203 can be imaged simultaneously, including the horizon 201.

If the camera 10 is attached without dynamic control, the angle θ should be adjusted for horizontal flight at a constant altitude.

If the airframe is pitching (rotating around the Y axis) or rolling (rotating around the X axis), it is conceivable that the imaging range of the camera 10 will change. In this event, the imaging range can be more effectively optimized by controlling the camera 10 dynamically.

Figure 3:
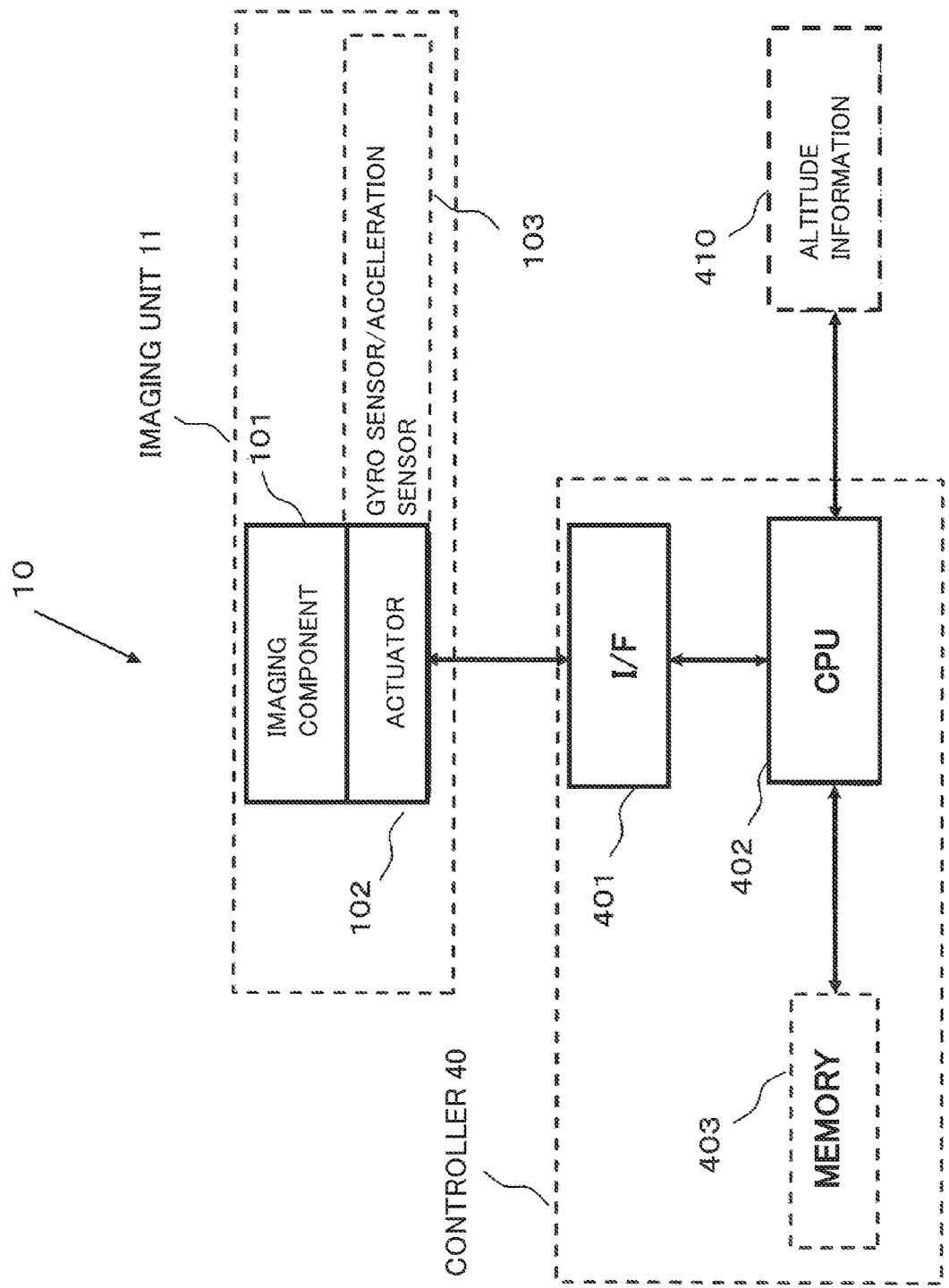
FIG. 3 is a block diagram of the configuration for dynamically controlling the imaging range of the camera in Embodiment 1.

FIG. 3 is a block diagram of the configuration for dynamically controlling the camera 10. The camera 10 comprises an imaging unit 11 and a controller 40. The image captured by an imaging component 101 in the imaging unit 11 is transmitted via an interface 401 to a CPU 402. The CPU 402 uses image processing to confirm whether the horizon 201 is within the imaging range, and if the horizon 201 is not in the imaging range, an actuator 102 is used to adjust the orientation of the camera 10 so that the horizon 201 will fall within the imaging range 110.

Whether or not the horizon 201 is within the imaging range 110 can be determined not only by image processing, but also from the angle of view of the camera, the altitude, and the orientation of the camera. In this case, the angle of view of the camera 10 is stored ahead of time in a memory 403, and determination is made using altitude information 410 acquired by a GPS, etc. and a gyro sensor 103, an acceleration sensor, etc. for determining the orientation of the camera 10. Information about the angle of view of the camera may be stored in the camera itself, or may be obtained via a server or a network.

A method for changing the angle of the camera 10 with the actuator 102 was described here, but the imaging range 110 may be changed by some other method.

Also, the imaging unit 11 and the controller 40 may be configured integrally as a camera or a camera unit.

Embodiment 2

In this embodiment, we will describe a means for optimizing the attachment position of the camera when capturing the view outside the aircraft.

An outside view imaging camera is usually attached outside the airframe of the aircraft. An aircraft usually flies at an altitude of approximately 10,000 meters, and the air temperature can drop to 50 degrees Celsius below zero, so a camera installed on the outside of the airframe needs a heater. An advantage of attaching an outside view imaging camera in an air-conditioned space is that there is no need to deal with a heater or the like. A specific example of the layout will be described through reference to the simplified diagrams in FIGS. 4 and 5.

Figure 4:
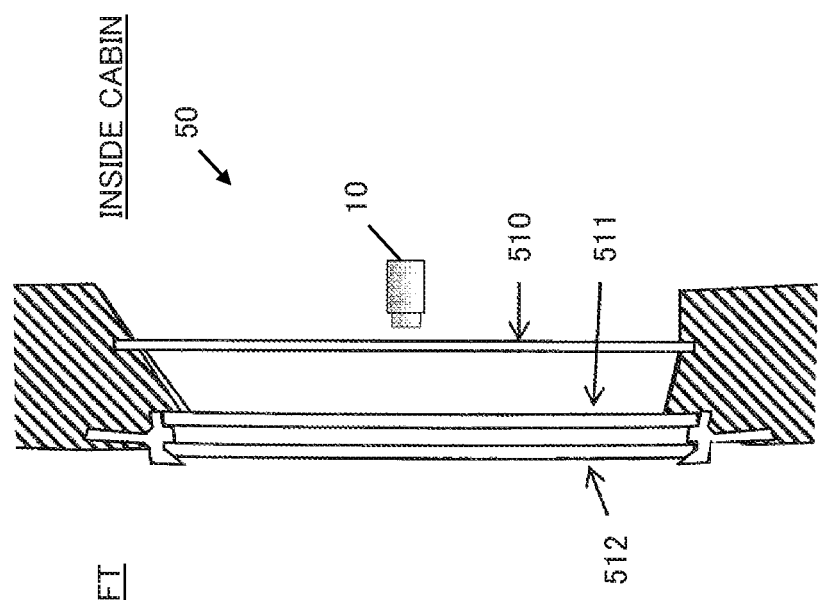
FIG. 4 is a simplified view of an example of the camera layout in Embodiment 2.

FIG. 4 is a simplified view of when the camera is attached inside the cabin. The camera 10 is attached on the cabin side of an inner acrylic sheet 510, so no individual mounting of a heater is required.

Figure 5:
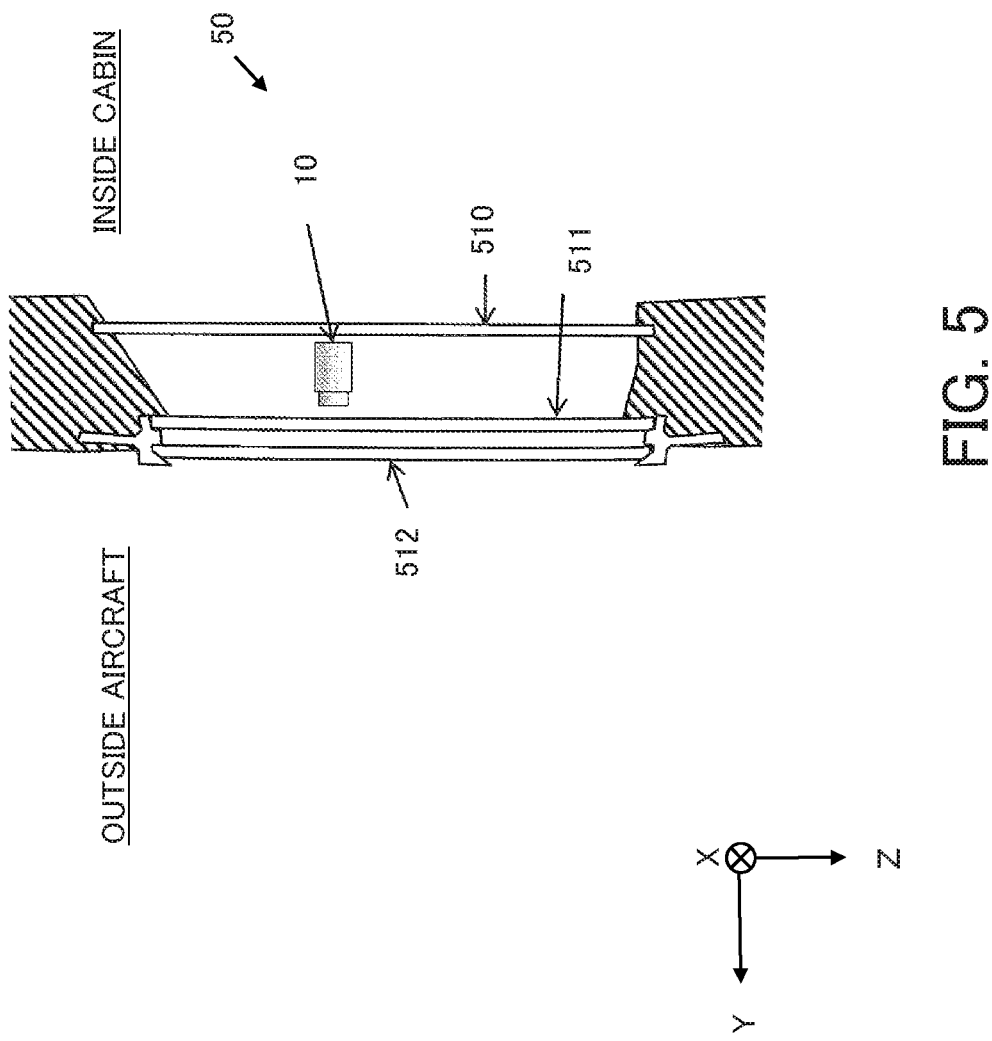
FIG. 5 is a simplified view of an example of the camera layout in Embodiment 2.

FIG. 5 is a simplified view of when an outside view imaging camera is attached to the inner layer of a double-paned window 50. This double-paned window is made up of a middle acrylic sheet 511 and an outer acrylic sheet 512. Usually, a hole is made in the inner acrylic sheet 510 and there is a flow of air between it and the cabin, so disposing the camera 10 between the inner acrylic sheet 510 and the middle acrylic sheet 511 makes it possible to dispose the camera in an air-conditioned space.

Figure 6:
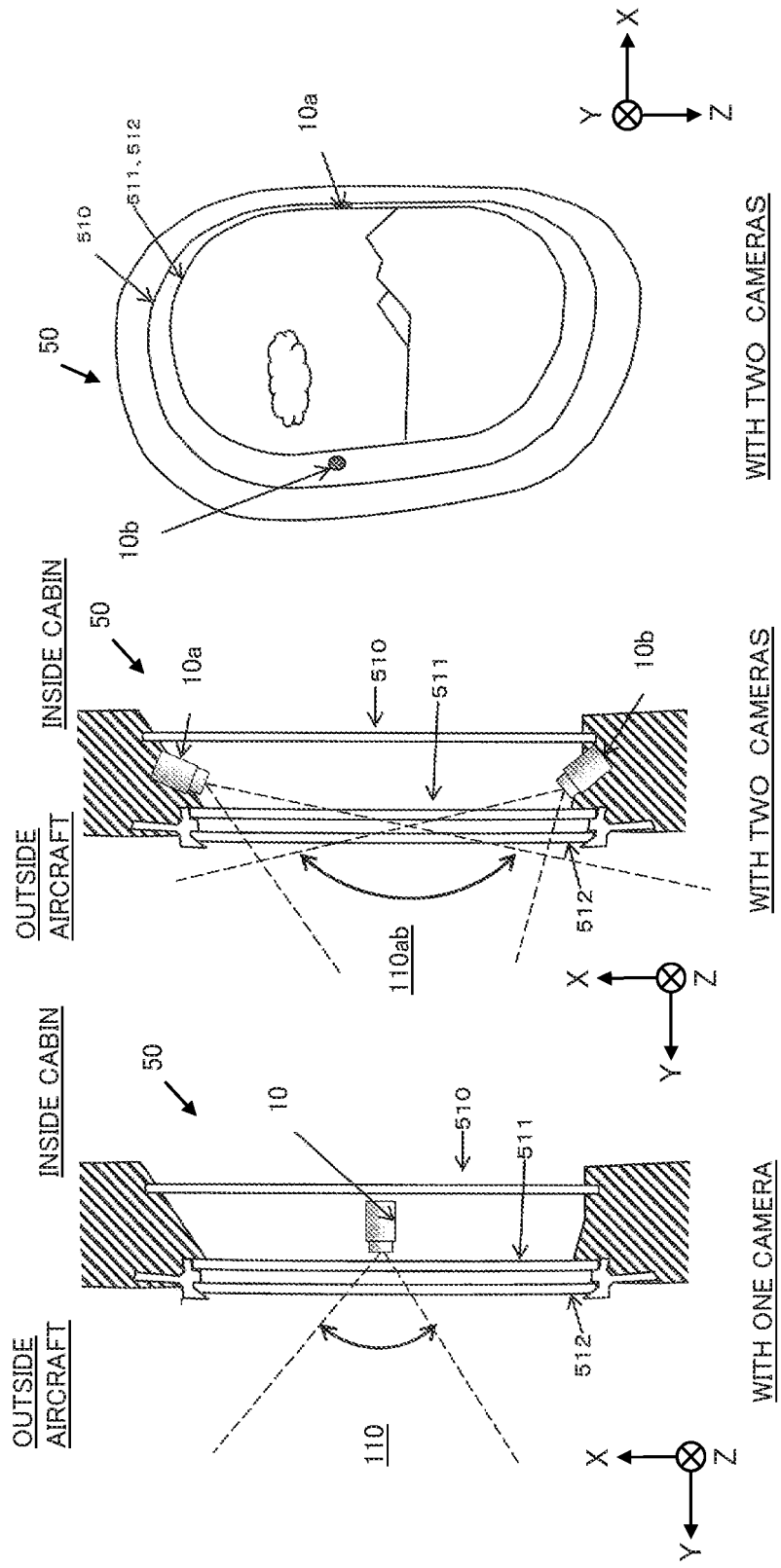
FIG. 6A is a simplified view of an example of the layout when one camera is disposed in one window in Embodiment 2.
FIG. 6B is a simplified view of an example of the layout when a plurality of cameras are disposed in one window in Embodiment 2.
FIG. 6C is a simplified view of an example of the layout when a plurality of cameras are disposed in one window in Embodiment 2.

Also, disposing a plurality of cameras as in FIGS. 6A to 6C is an effective way to expand the imaging range from a single window 50. As shown in FIG. 6A, when there is just one camera 10, the imaging range 110 can be captured. An imaging range 110ab, which is wider than the imaging range 110, can be captured by disposing two cameras 10a and 10b so that their imaging ranges intersect, as in FIG. 6B. More specifically, as shown in FIG. 6B, the imaging range is expanded by pointing the left camera 10b to the right, and the right camera 10a to the left.

FIG. 6B shows a method for expanding the imaging range in the left and right direction by disposing a plurality of cameras in the left and right direction, but the imaging range can also be expanded in the up and down direction by disposing a plurality of cameras in the up and down direction. Other methods are also possible, and the same effect can be anticipated regardless of the method.

As shown in FIG. 6C, when a camera 10 is provided to the airframe wall between the middle acrylic sheet 511 and the inner acrylic sheet 510, a wide imaging range can be ensured without blocking the view of the passenger.

Embodiment 3

In this embodiment, we will describe the layout when an outside view imaging camera for aircraft is attached to a window.

Figure 7:
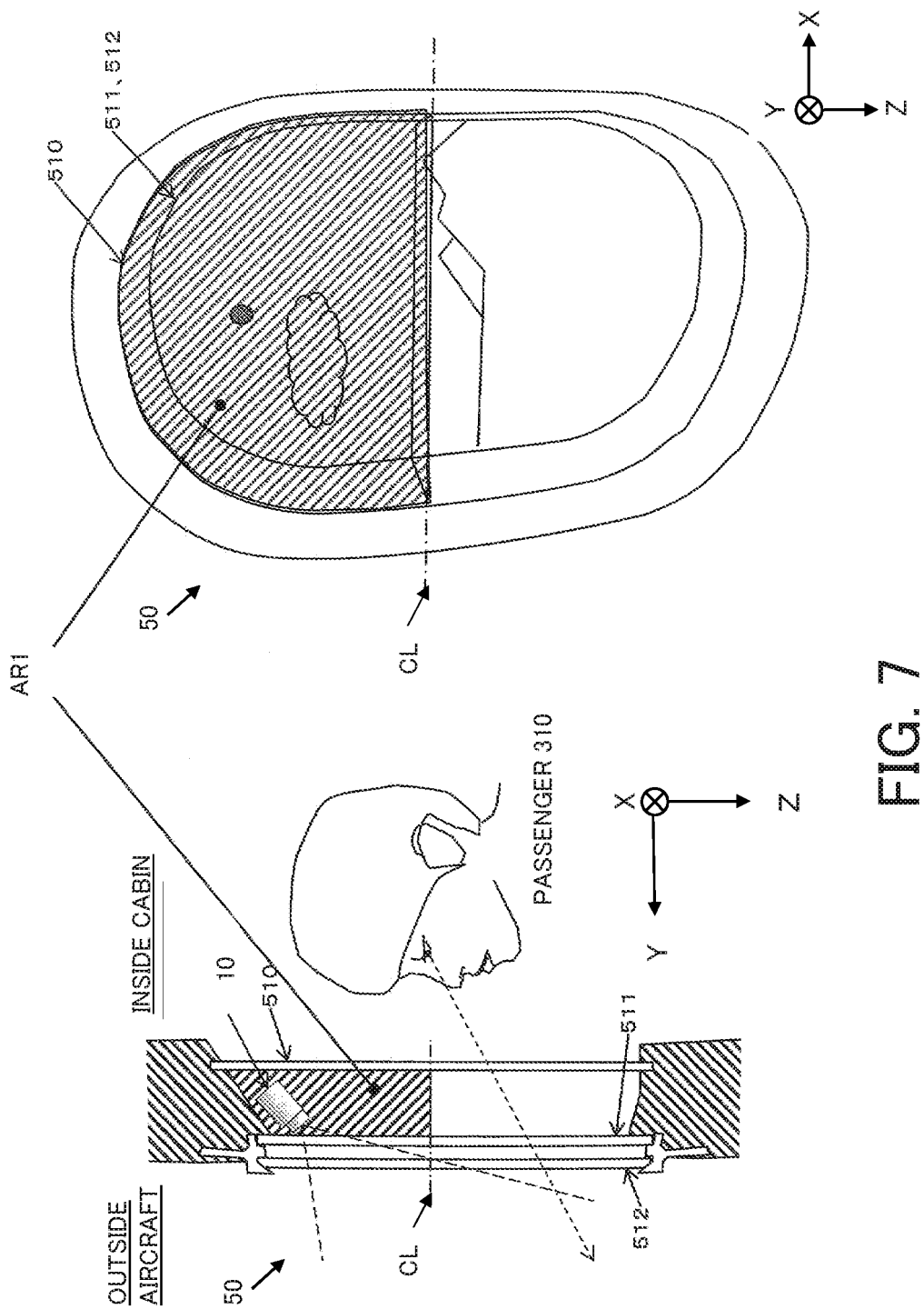
FIG. 7 is a simplified view related to the layout when an outside view imaging camera for aircraft is attached to a window in Embodiment 3.

As shown in FIG. 7, when a camera 10 is attached within a specific range (such as a partial area AR1 of the window 50, etc.), it is disposed above the center line CL in the up and down direction of the window. This allows the imaging range to be expanded in the downward (ground) direction. In general, a passenger is more likely to be looking at the ground, except when looking at a starry sky or the like, so video can be acquired that better matches the interest of the passenger. Furthermore, since a passenger is more apt to be looking down, installing the camera in the upper half of the window will not block the view of the passenger.

Furthermore, this effect of not blocking the view of a passenger can also be obtained by disposing cameras in spaces where passengers are not seated, such as in the restrooms, the galley, near the emergency doors, and areas near crew seating.

Embodiment 4

In this embodiment, we will describe an installation method when a camera is installed at a window 50 equipped with a shade.

Shades are normally attached to windows to block sunlight, etc., and because they are made to block light, a problem is that the imaging range will be narrowed if the shade is disposed in front of the camera. To solve this problem, the camera should be disposed more to the outside of the airframe than the shade. With a double-paned window or another such window with a multilayer structure, the camera is disposed more to the outside than the inner layer of the airframe, which makes it possible to acquire video of the outside of the aircraft without being affected by a shade, dimmable window, or the like.

Figure 8A:
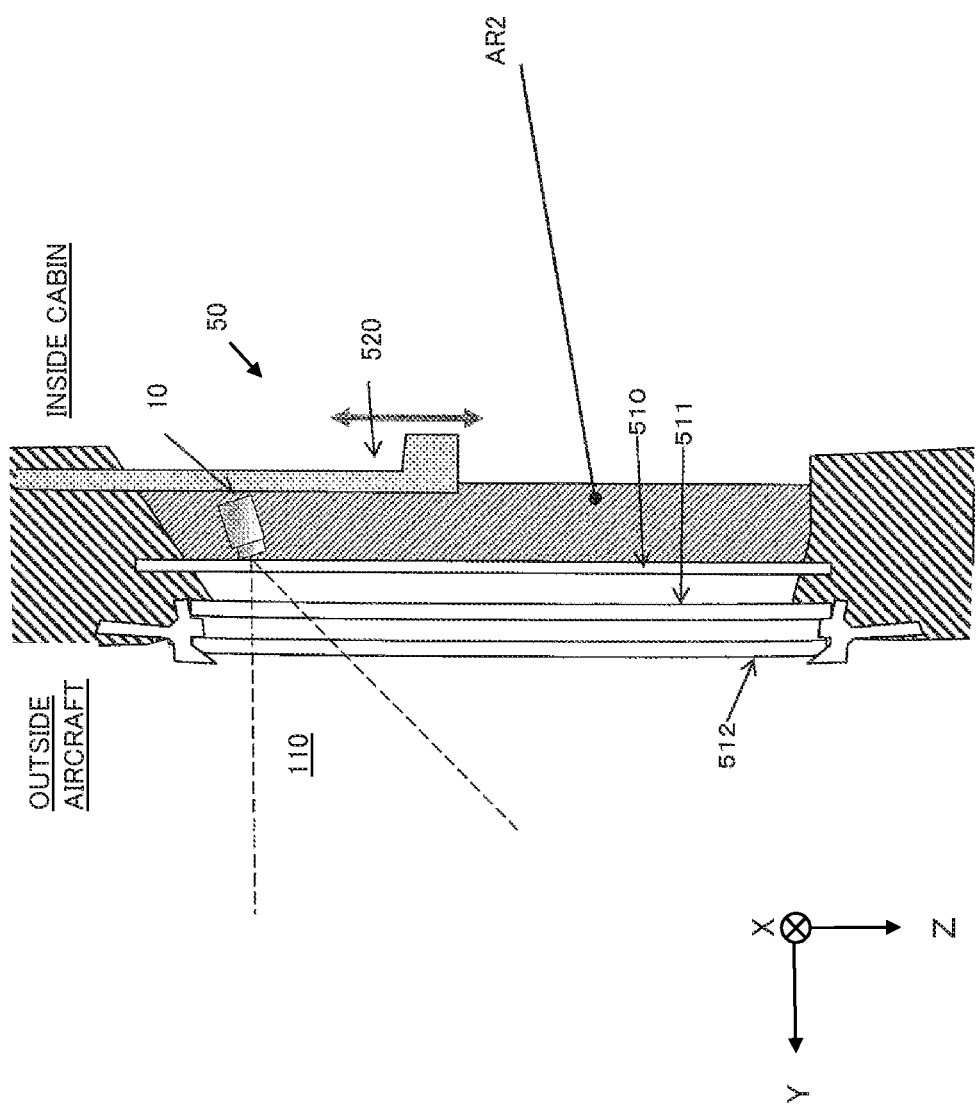
FIG. 8A is a simplified view of the installation method when a camera is installed at a window equipped with a shade in Embodiment 4.

FIG. 8A shows an example in which the camera 10 is disposed within a specific range (such as the area AR2) between the shade 520 and the inner acrylic sheet 510. FIG. 8B shows an example in which the camera 10 is disposed within a specific range (such as the area AR3) between the inner acrylic sheet 510 and the middle acrylic sheet 511. In both cases, the shade does not go into the imaging range 110, making it possible to acquire video over a wide range.

Figure 9:
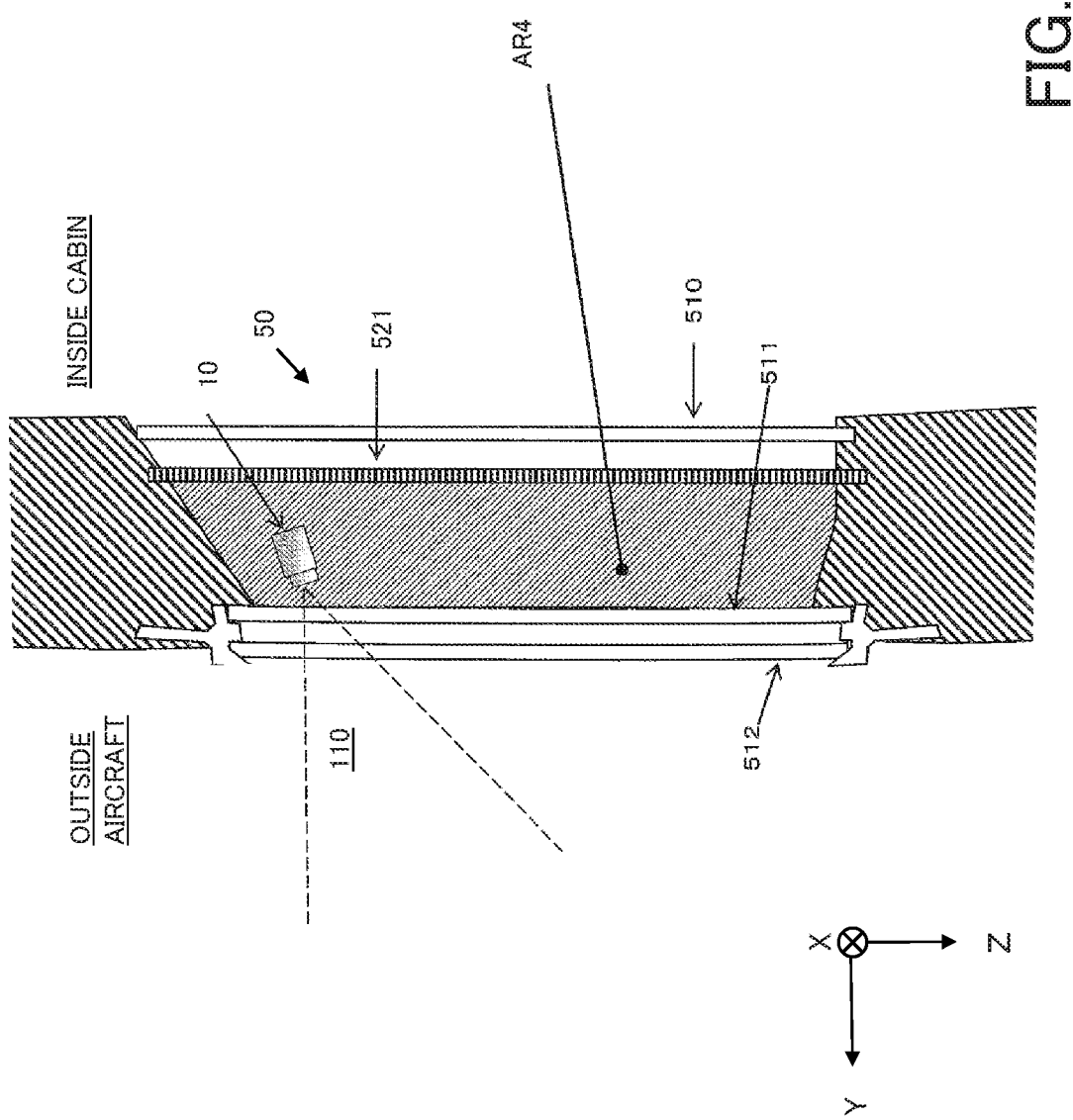
FIG. 9 is a simplified view of the installation method when a camera is installed at a dimmable window in Embodiment 4.

FIG. 9 shows an example of the window 50 that has a dimmable window 521. A typical dimmable window (or electronic shade) electrically adds or removes color to or from the window, thereby controlling the optical transmissivity. With these dimmable windows, imaging by the camera can be blocked just as with a conventional shade, so the camera is disposed within a specific range (such as the area AR4) to the outside of this layer, allowing video of the outside of the aircraft to be captured without being blocked.

Figure 10:
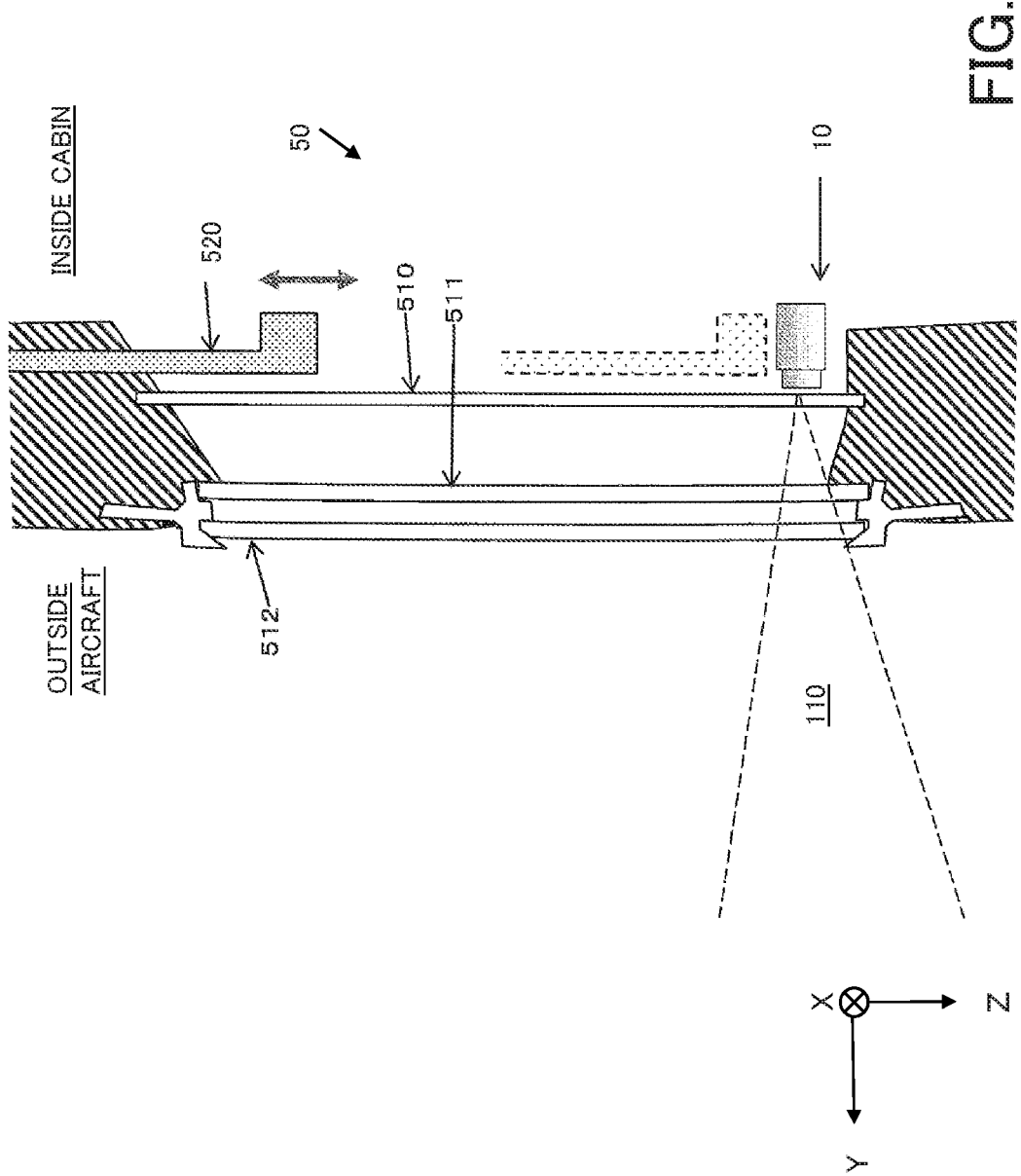
FIG. 10 is a simplified view of the installation method when a camera is installed at a window equipped with a movable shade in Embodiment 4.

Also, a typical movable shade usually slides away from one side. Therefore, the camera is installed on the opposite side from the place where the shade is housed. This is shown in FIG. 10. This prevents the shade 520 from blocking the camera 10, allowing wider imaging.

Figure 11:
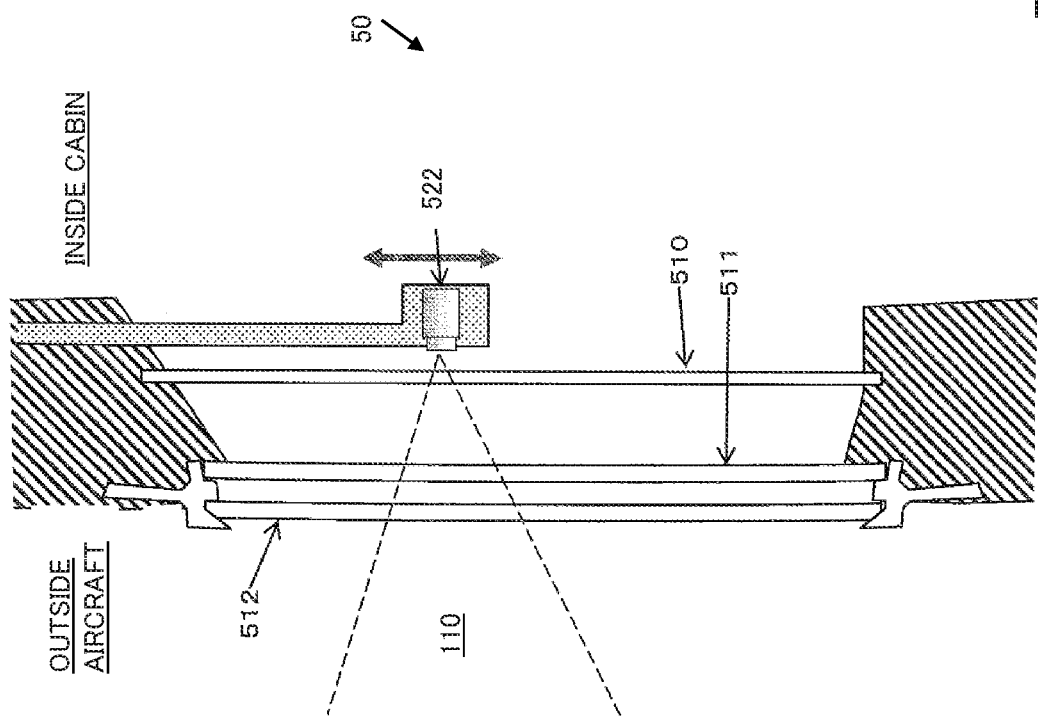
FIG. 11 is a simplified view of the installation method when a camera-integrated shade is used in Embodiment 4.

Also, imaging of outside the aircraft can be done without being blocked by the shade if the camera is disposed on the shade itself. FIG. 11 is a simplified view of this. A camera-integrated shade 522 is formed, which prevents the shade from getting in the way of camera imaging.

In the examples shown in FIGS. 8A, 8B, 9, 10, and 11, the camera layout is seen in the roll axis direction (the X axis direction) of the airframe, but the same effect is obtained when the layout is seen in the yaw axis direction (the Z direction) of the airframe, in which a shade is opened and closed in the left and right direction.

Embodiment 5

In this embodiment, we will describe a method for correcting the blind spot generated when combining images captured by a plurality of cameras.

Figure 12:
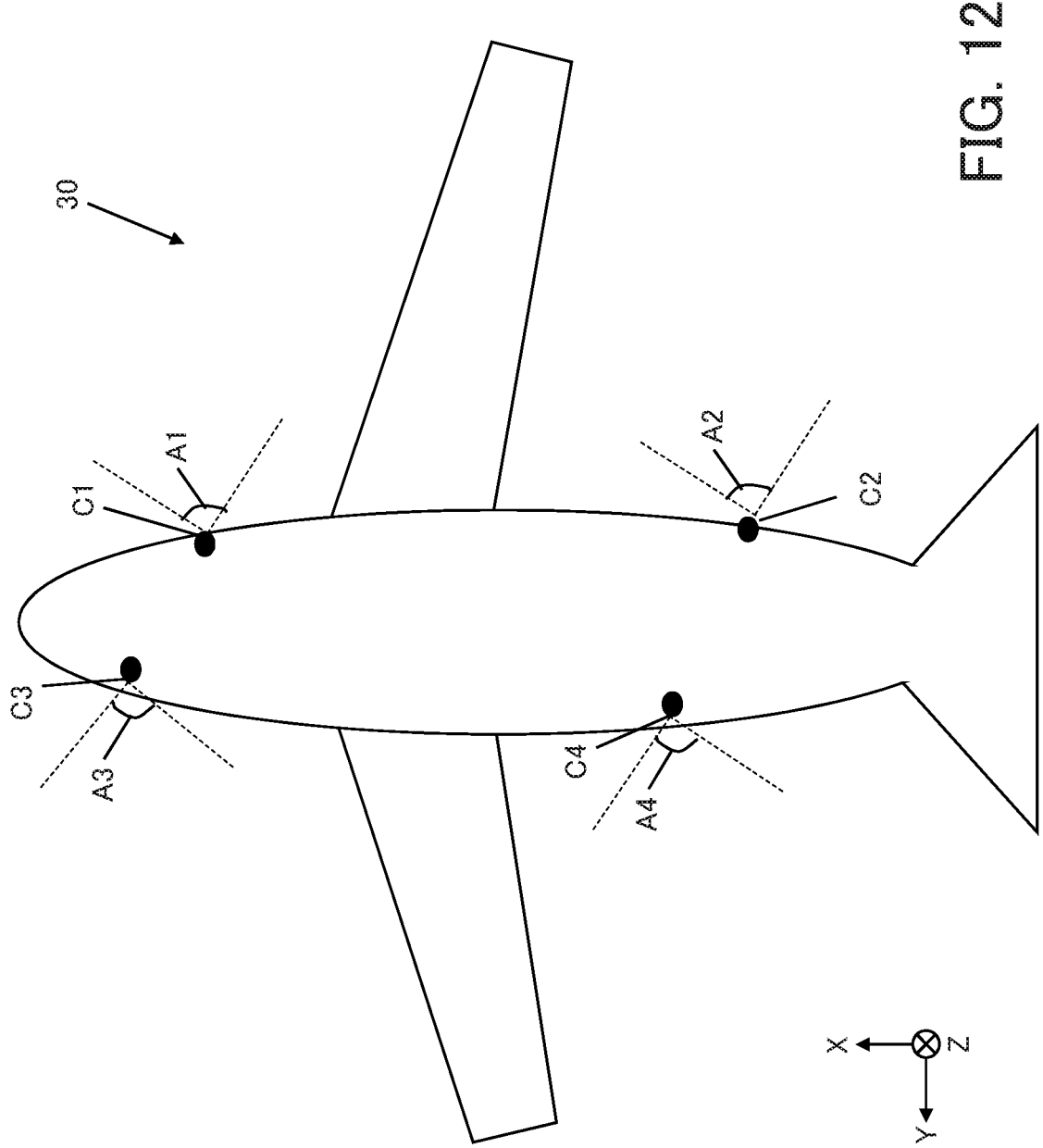
FIG. 12 is a simplified view of a camera layout example in Embodiment 5.

As discussed in the embodiments given above, when a plurality of outside view imaging cameras are disposed, their video can be combined to obtain a wider imaging range, such as an omnidirectional image. However, the airplane itself or other factors may result in the occurrence of a blind spot where video cannot be acquired from any of the cameras. For instance, as shown in FIG. 12, when cameras C1, C2, C3, and C4 are installed at a total of four locations on the lateral faces on both sides of the airframe (near where the windows are installed), there are portions not included in the imaging range of any of the cameras C1 to C4, that is, blind spots. When this happens, there will be portions where no image is obtained. The cameras C1, C2, C3, and C4 respectively have angles of view A1, A2, A3, and A4.

In a situation such as this, the following image processing is performed so that the images delivered to the passengers (the users) will be in a natural state.

Figure 13A:
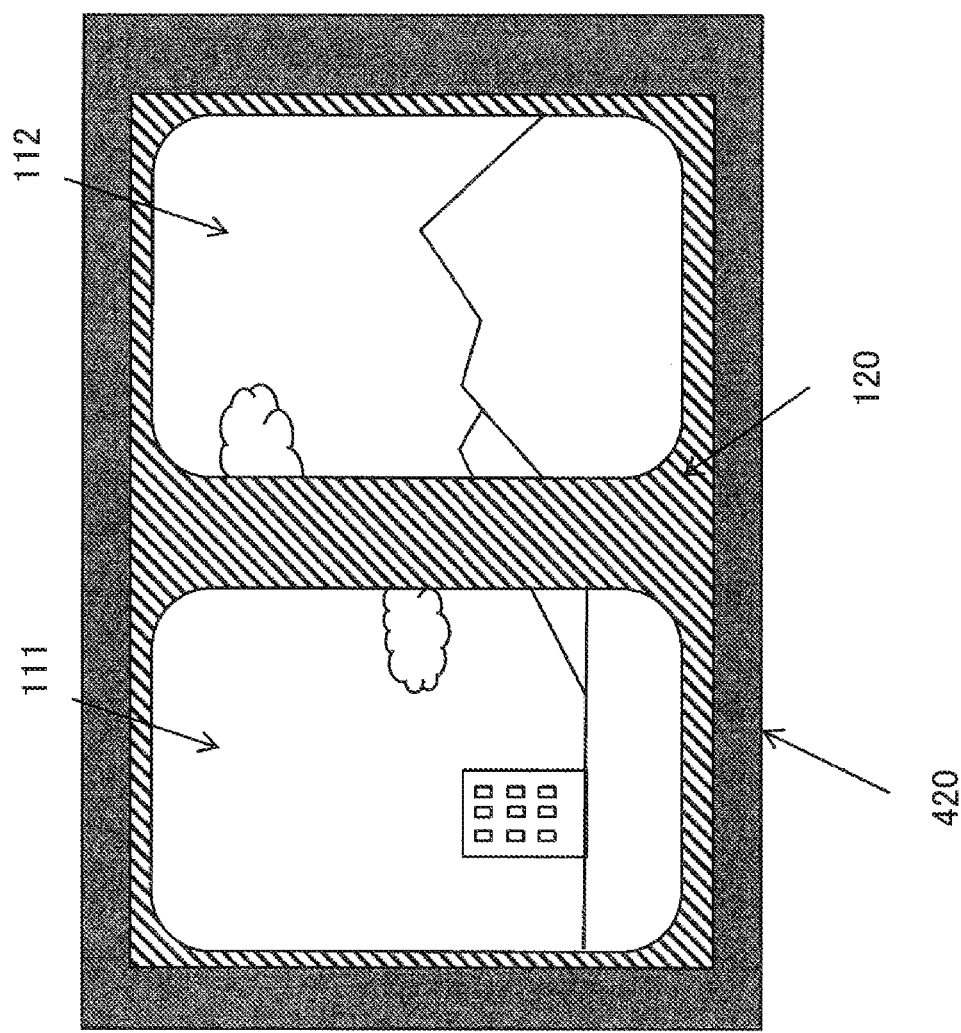
FIG. 13A is a simplified view of an example of when a blind spot that has been created in the combination of images is corrected by color change in Embodiment 5.
Figure 13B:
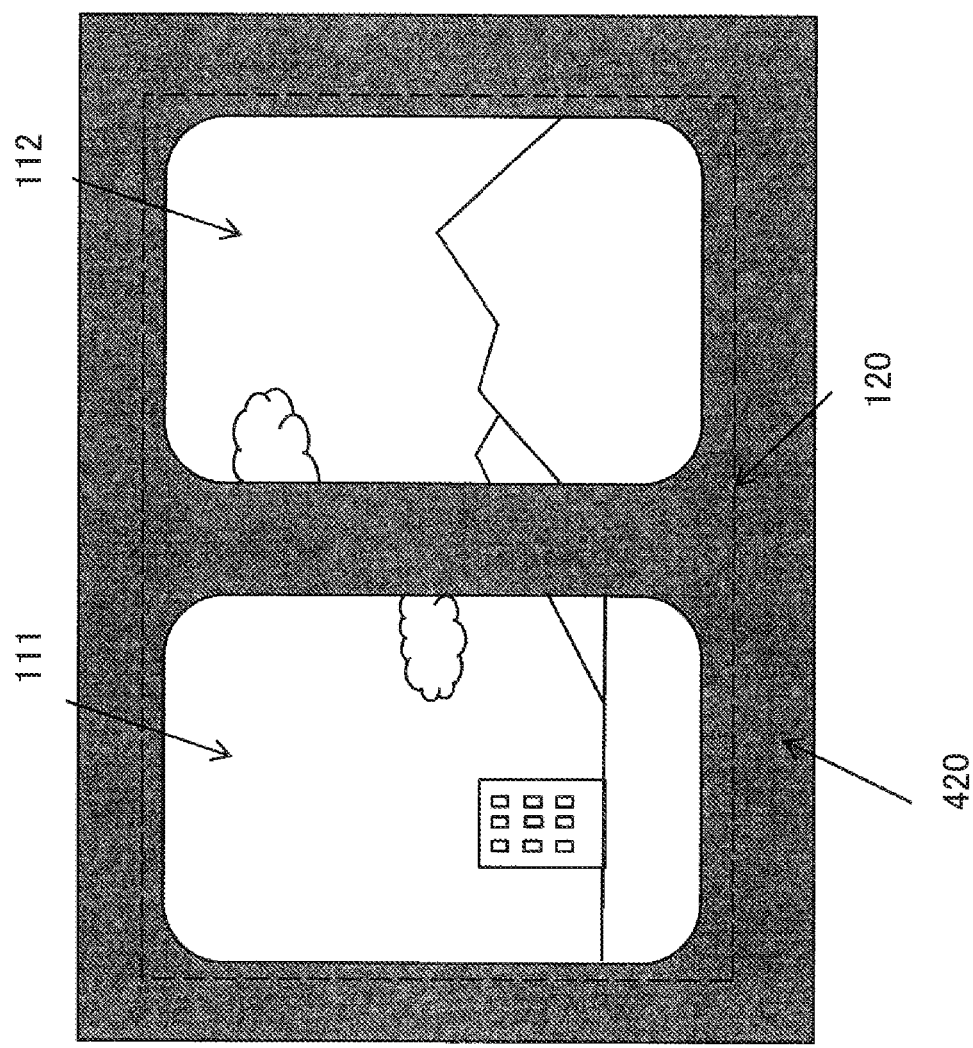
FIG. 13B is a simplified view of an example of when a blind spot that has been created in the combination of images is corrected by color change in Embodiment 5.

For example, the blind spots are made to look more natural to the passengers by making them gray or matching them to the surrounding interior, such as the color of the cabin or the color of the border around the monitor. Also, if the image is of the sky, any blind spots may be filled in with a color close to the color of the sky, such as blue or white. FIGS. 13A and 13B are simplified views of when a blind spot 120 is corrected with the color of the monitor border 420. The image shown in FIG. 13A, which includes the left and right image data 111 and 112, is in the pre-correction state, in which the passenger can easily see the blind spot 120 and the missing image stands out. By contrast, in FIG. 13B, the blind spot 120 between the left and right image data 111 and 112 is corrected with the color of the monitor border 420, so that the missing image does not stand out, resulting in an image that is easier for the passenger to appreciate.

Also, expanding the image is a simple way to reduce the blind spot range. This will be described through reference to the diagrams shown in FIGS. 14A to 14C.

Figure 14A:
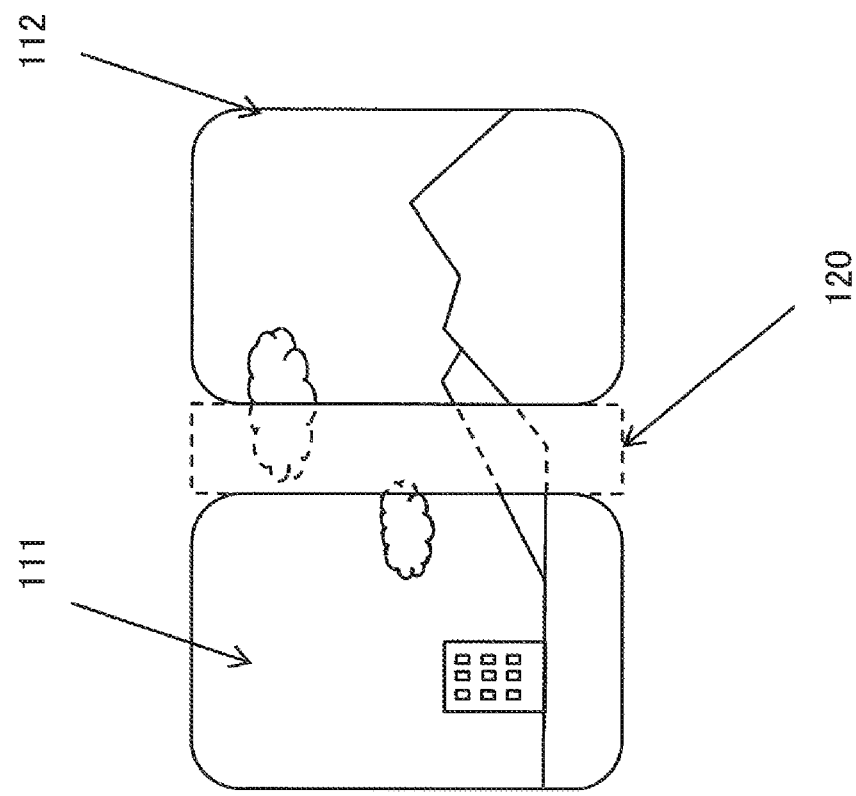
FIG. 14A is a simplified view of an example of when a blind spot that has been created in the combination of images is corrected by image enlargement in Embodiment 5.

FIG. 14A shows an image prior to the correction of the blind spot, where the blind spot 120 is formed between the left and right image data 111 and 112. The left and right image data of this original image are expanded by at least double and over a range that does not overlap adjacent image data, thereby making the blind spot 120 smaller. The captured image after expansion processing has been performed is an image that includes image data 111*a* and 112*a*, shown in FIG. 14B. This makes it possible to provide the passenger with video having a narrower blind spot 120*a*.

Figure 14B:
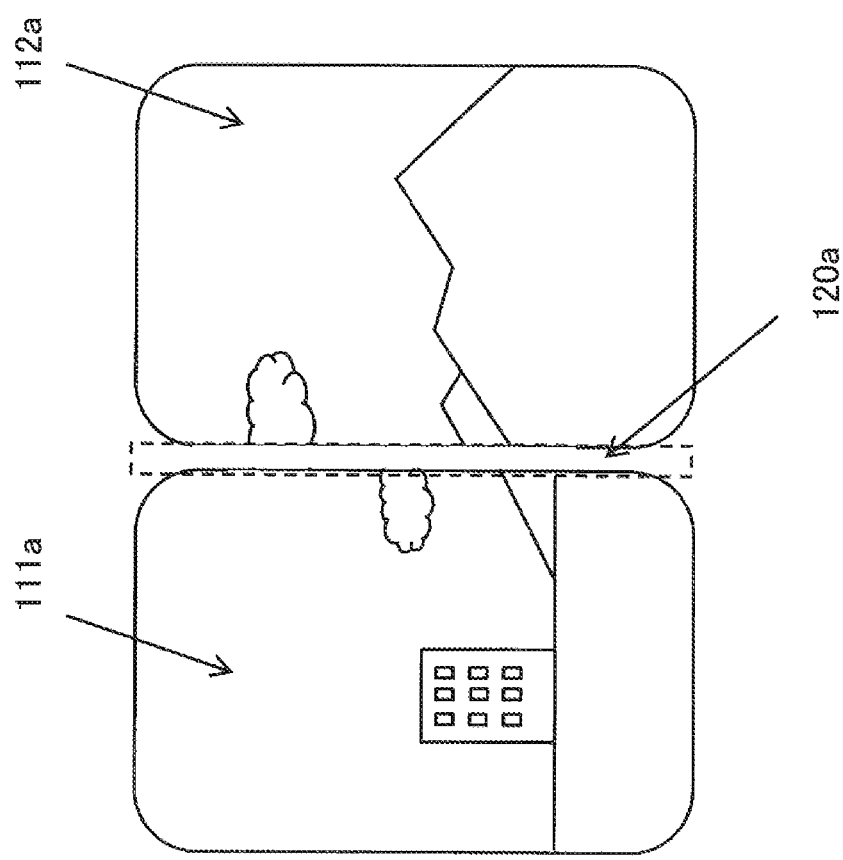
FIG. 14B is a simplified view of an example of when a blind spot that has been created in the combination of images is corrected by image enlargement in Embodiment 5.

More specifically, with the image processing shown in FIGS. 14A and 14B, the left and right image data are substantially expanded by changing the angle range of the left and right image data 111 and 112. The change of the angle range includes performing image processing on the left and right image data 111 and 112 (FIG. 14A) in at least one direction so that they will have an angle range larger than that of the angles of views A1 to A4 of the cameras C1 to C4 that have been stored in advance. As a result, as shown in FIG. 14B, this produces image data 111*a* and 112*a*, which have been expanded larger than the original image data acquired from the cameras C1 to C4. Thus, enlarging the angle range covers some of the places where no image is actually obtained, and produces an image over a wider range that is more natural.

Figure 14C:
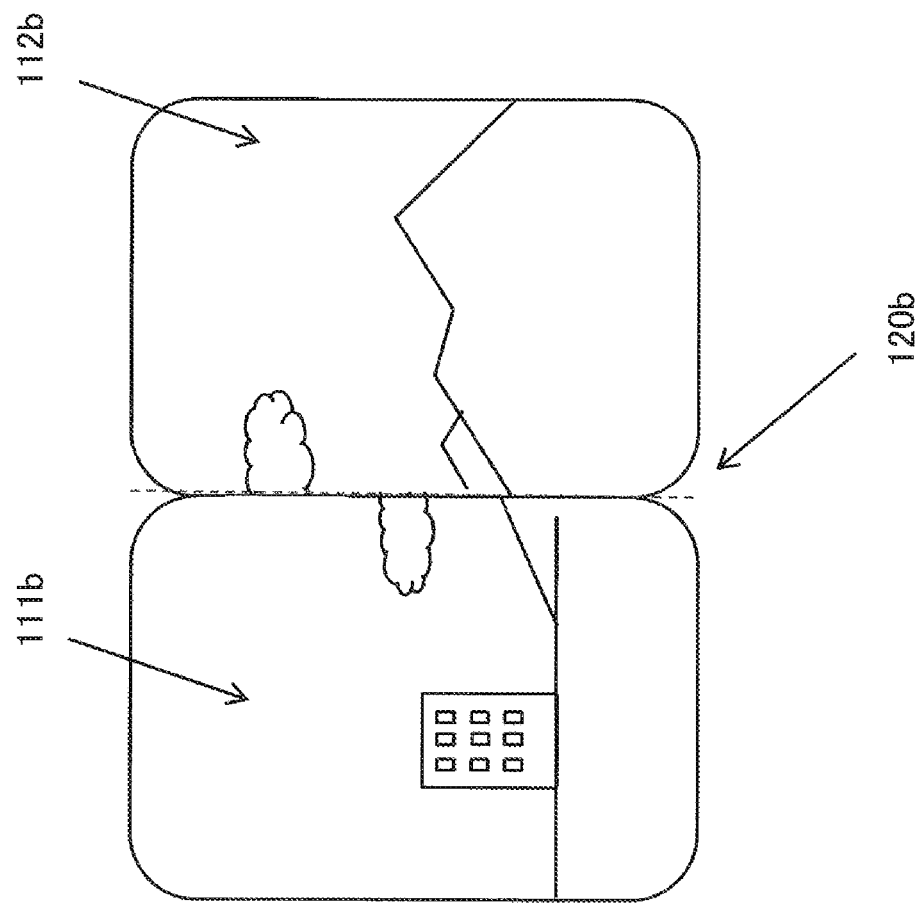
FIG. 14C is a simplified view of an example of when a blind spot that has been created in the combination of images is corrected by image enlargement in Embodiment 5.

As shown in FIG. 14C, however, if the angle range of the left and right image data 111 and 112 is changed to the image data 111*b* and 112*b*, and the blind spot 120*b* is narrowed so much that it cannot be seen, the non-contiguous part between the left and right image data 111*b* and 112*b* will end up being emphasized, which conversely has the effect of making it look unnatural to the passenger. Thus, a more natural image will be obtained by forming a gap (the blind spot 120*a*) large enough to be visible to the passenger between the image data 111*a* and 112*a*.

The image correction methods described through reference to FIGS. 13A and 13B and FIGS. 14A to 14C are not exclusive, and can also be performed simultaneously. Also, information can be provided while reducing the blind spot by filling in the blind spot with advertising or in-flight messages.

The above-mentioned image processing is executed by a server device that acquires camera video and transmits it to the passenger terminals. The configuration and function of a server device for executing image processing will now be described.

Figure 15:
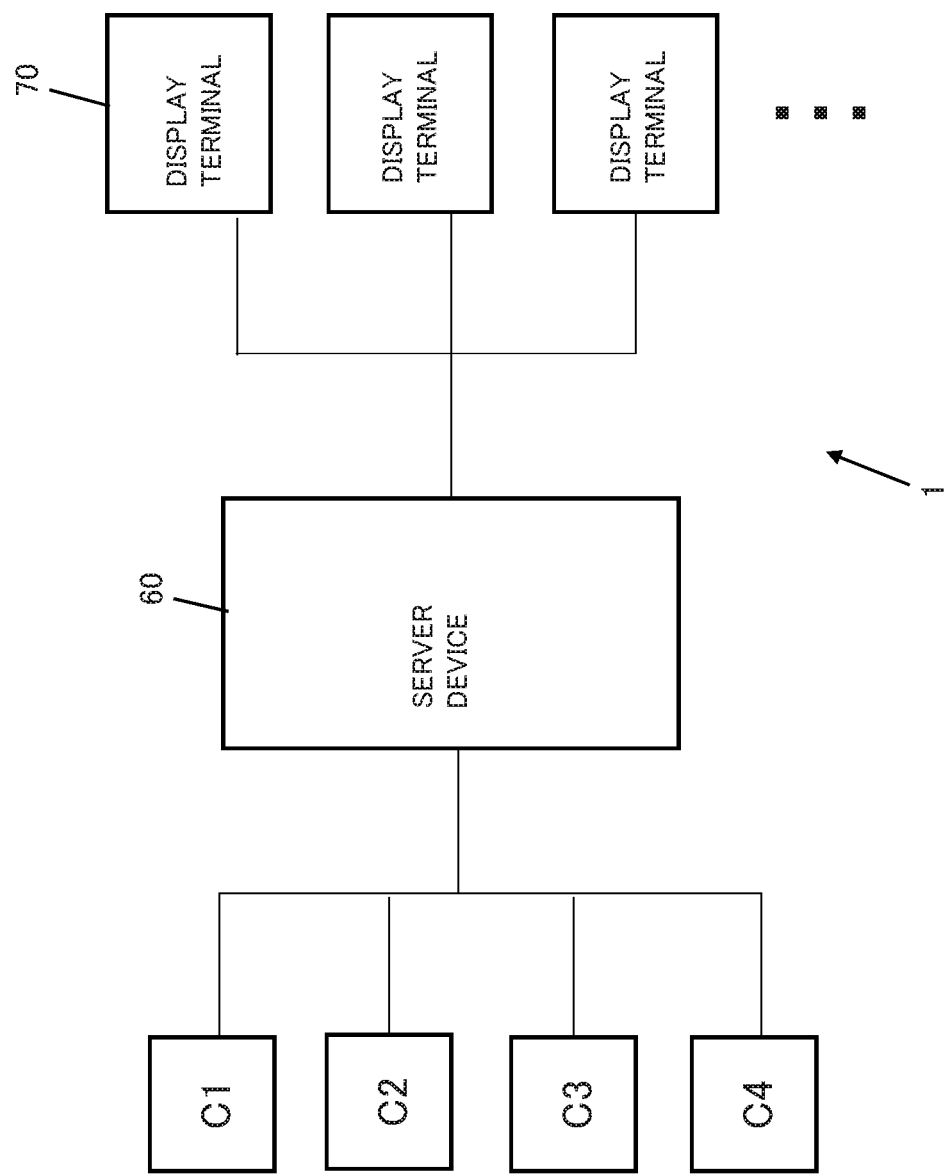
FIG. 15 is a simplified overall diagram of the system pertaining to Embodiment 5.

FIG. 15 is a simplified view of the overall configuration of an image processing system 1 pertaining to this embodiment. The image processing system 1 comprises a plurality of cameras C1, C2, C3, and C4, and a server device 60 (an example of a control device) that is connected to the cameras C1, C2, C3, and C4. A display terminal 70 (client terminal) is connected to the server device 60.

The server device 60 acquires the images captured by the cameras C1, C2, C3, and C4 and subjects them to image processing, after which it sends the captured images to the display terminal 70, and a passenger can view video of the outside of the aircraft on the display terminal 70. The server device 60 performs the above-mentioned image processing on the images acquired from the cameras C1, C2, C3, and C4.

Figure 16:
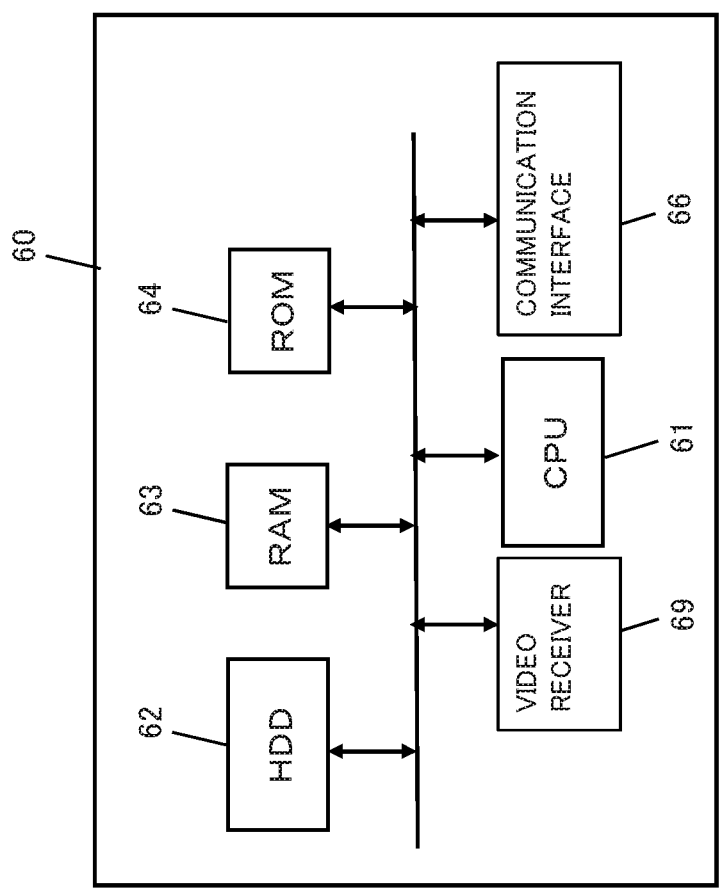
FIG. 16 is a simplified configuration diagram of the server device pertaining to Embodiment 5.

FIG. 16 is a simplified diagram of the physical configuration of the server device 60.

The server device 60 is a computer device that is installed in the aircraft 30. The server device 60 comprises a CPU 61, a hard disk drive 62, a RAM 63, a ROM 64, and a communication interface 66. The CPU 61 is a processor or circuit that executes processing according to a specific program. The hard disk drive 62 holds various programs and data, such as applications and operating systems. The hard disk drive 62 may also be connected to the server device 60 as a separate memory device. The RAM 63 temporarily holds control programs and data as working memory. The ROM 64 stores control programs and the like that give the processing procedures for the CPU 61. The communication interface 66 communicates wirelessly or by wire with the display terminal 70. A video receiver 69 includes circuits and connectors for sequentially receiving the images captured by the cameras C1 to C4.

Figure 17:
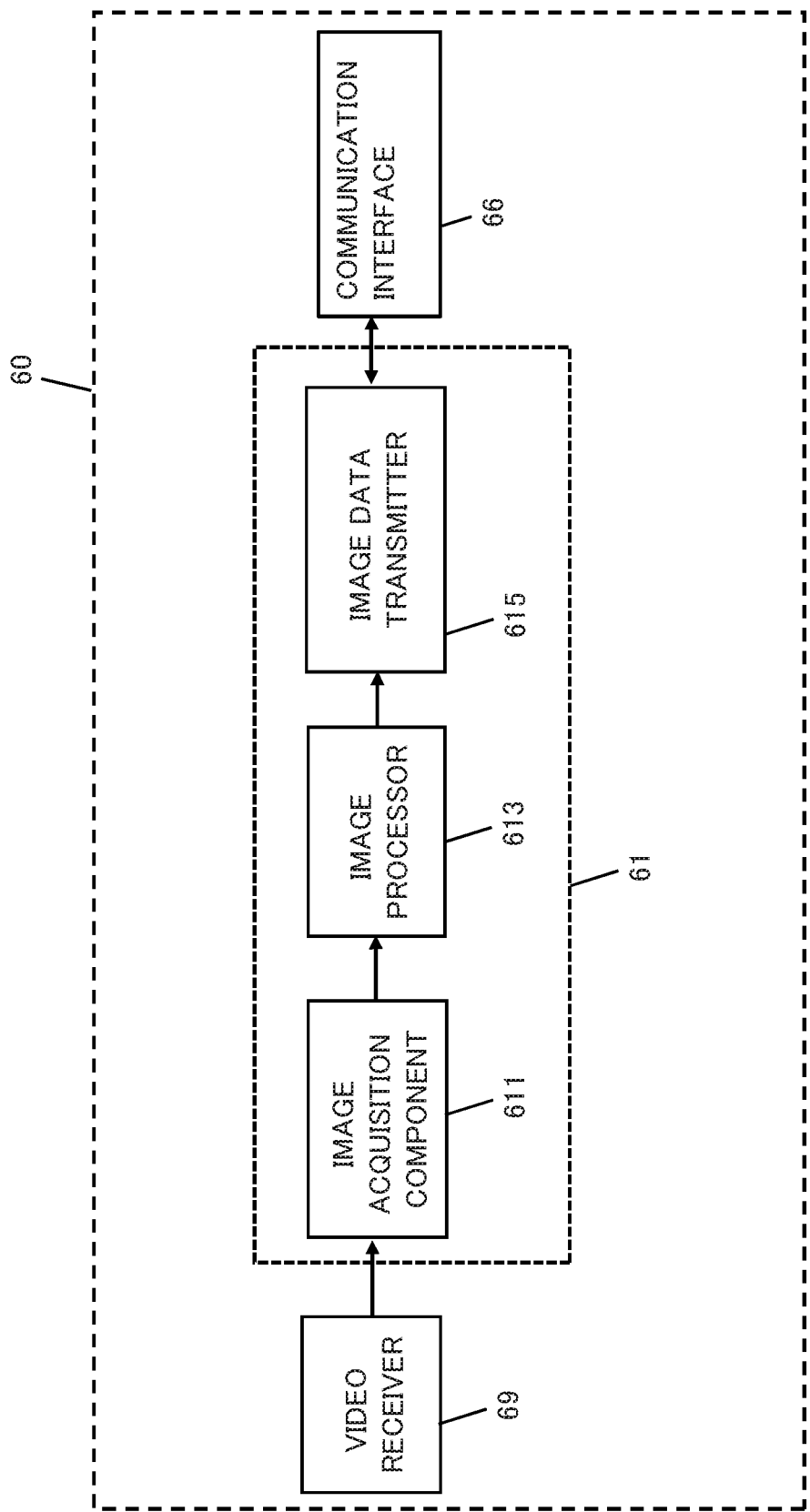
FIG. 17 is a function configuration diagram of the server device.

FIG. 17 is a simplified view of the functional configuration of the server device 60. The server device 60 is an image processing device in which the CPU 61 reads a specific program and executes the processing. The functions of an image acquisition component 611, a camera information acquisition component 612, an image processor 613, and an image data transmitter 615 are executed by the CPU 61.

The image acquisition component 611 acquires images (live video) received from the cameras C1 to C4 via the video receiver 69. The image processor 613 performs specific image processing on the images on the basis of data stored ahead of time in a memory, etc.

The specific image processing includes performing stitching processing on the images of the cameras C1 and C2 to produce the above-mentioned image data 111 (such as that shown in FIGS. 13A and 14A), performing stitching processing on the images of the cameras C3 and C4 to produce the above-mentioned image data 112 (such as that shown in FIGS. 13A and 14A), and performing blind spot correction processing (such as the processing shown in FIGS. 13B and/or 14B) on these image data 111 and 112, as discussed above.

The image data transmitter 615 specifies the display terminals 70 for transmission, and transmits the image data that have undergone image processing to the specified display terminals 70 via the communication interface 66.

The image produced by the server device 60 as above is sent to the display terminals 70 being used by the passengers, allowing the passengers to watch live video of the view outside the aircraft.

Embodiment 6

In this embodiment, we will describe an example of a camera system 100 (an example of an imaging system) in which outside view imaging cameras 10*c* (an example of a first camera or a second camera) and 10*d* (an example of a second camera or a first camera) for aircraft are disposed flanking the main wing 301.

In the following description, the roll axis, pitch axis, and yaw axis that pass through the center point C of the airframe of the aircraft are called the X axis, the Y axis, and the Z axis, respectively.

Figure 18:
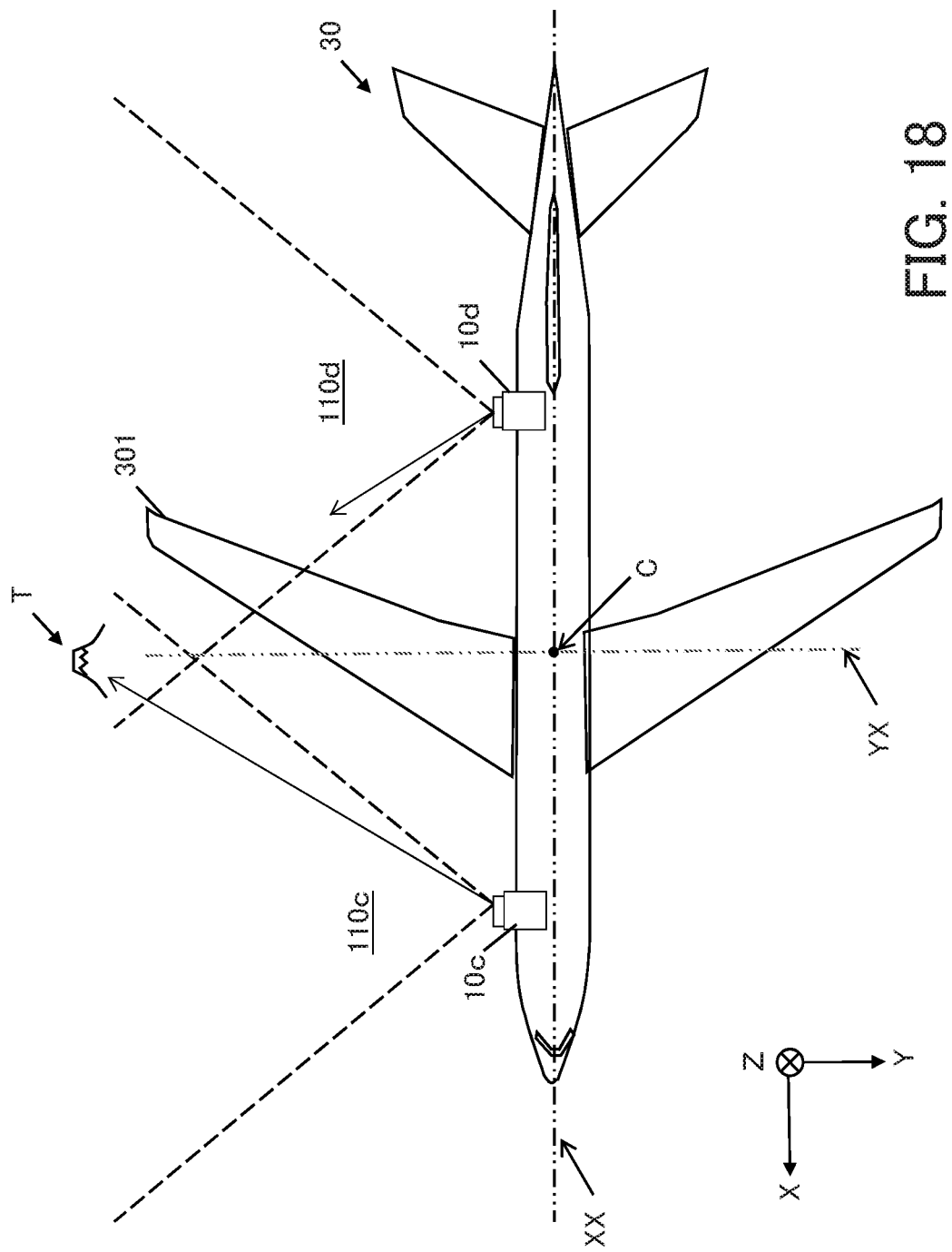
FIG. 18 is a simplified view of an example of the layout of a plurality of cameras flanking the main wing in Embodiment 6.

FIG. 18 is a simplified view of the layout of two cameras 10*c* and 10*d* that capture the view outside the aircraft. The cameras 10*c* and 10*d* are disposed flanking a main wing 301, allowing the view that is blocked by the main wing from the camera on one side to be captured by the camera on the other side, which makes it possible to acquire a wide captured image. In the example shown in FIG. 18, the imaging target T, which does not fall into the imaging range 110*d* of the camera 10*d* to the rear of the main wing 301 (an example of a second imaging range or a first imaging range), fall into the imaging range 110*c* of the camera 10*c* to the front of the main wing 301 (an example of a first imaging range or a second imaging range), so that the overall imaging range is complemented. For the sake of description here, the imaging target T is described as a prominent target, but the imaging target is not limited to this.

The two cameras 10c and 10d are disposed along the X axis of the aircraft 30, facing in the same direction. The imaging ranges 110c and 110d of the cameras 10c and 10d partially overlap. The images obtained from the cameras 10c and 10d are combined into a single image by stitching processing, just as with the image data from the cameras C1, C2 or the image data from the cameras C3, and C4 in Embodiment 5.

The two cameras 10c and 10d are disposed so that their imaging ranges 110c and 110d overlap an extension of the Y axis YX (pitch axis) of the airframe of the aircraft 30, and do not overlap the X axis XX (roll axis) or an extension thereof. The imaging ranges 110c and 110d also include a range in the Z axis direction (a direction perpendicular to the viewing plane in FIG. 18), and not just the X axis direction (the left and right direction in FIG. 18). The two optical axes of the cameras 10c and 10d are parallel to the Y axis YX.

The two cameras 10c and 10d are disposed so as to have a parallel orientation in a plane that includes the optical axis of the camera 10c and the optical axis of the camera 10d. That is, the two cameras 10c and 10d are disposed so that a plane that includes the optical axis of the camera 10c and the optical axis of the camera 10d is parallel with the lateral direction of the cameras 10c and 10d (the left and right direction). Here, the left and right direction and the lateral direction of the cameras 10c and 10d correspond to the left and right direction or the lateral direction of rectangular imaging elements having top, bottom, left, and right sides, which are built into the cameras 10c and 10d.

With this camera layout, since images with the same viewpoint height are obtained from the two cameras 10c and 10d, the resulting video looks natural. That is, when a single rectangular image is produced by combining the two sets of image data, there will be less offset in the imaging ranges between the two sets of image data. Thus, when stitching processing is performed, the parts that should be cut out from the upper and lower parts of the two sets of image data corresponding to the offset can be kept to a minimum. As the result, the range of video that has undergone stitching processing will be closer to the ranges that were actually captured by the cameras 10c and 10d.

Figure 19:
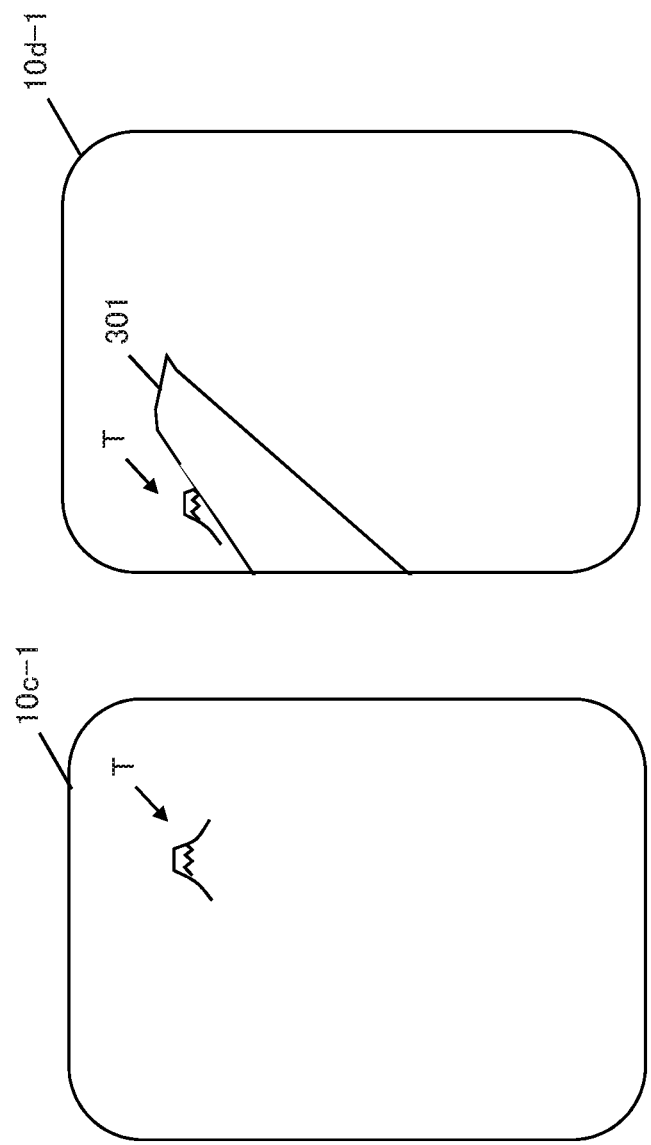
FIG. 19 shows an example of an image captured with a camera in Embodiment 6.

The two cameras 10c and 10d are disposed so that the main wing 301 is not included in the imaging range 110c of the front camera 10c, and the main wing 301 is included in the imaging range 110d of the rear camera 10d. FIG. 19 shows the videos 10c-1 and 10d-1 captured by the cameras 10c and 10d. As shown in the drawing, the main wing 301 can be seen in the video 10d-1 of the camera 10d, and hides the imaging target T, but the main wing 301 does not show up in the video 10c-1 of the camera 10c, so the imaging target T is visible. With this camera layout, even if a portion of the video of the camera 10d is hidden by the main wing 301, this can be compensated for by the video of the camera 10c when the videos are combined.

The layout of the cameras 10c and 10d is not limited to that in the above example. For instance, the following configurations are also possible.

Modification Example 1

Figure 20:
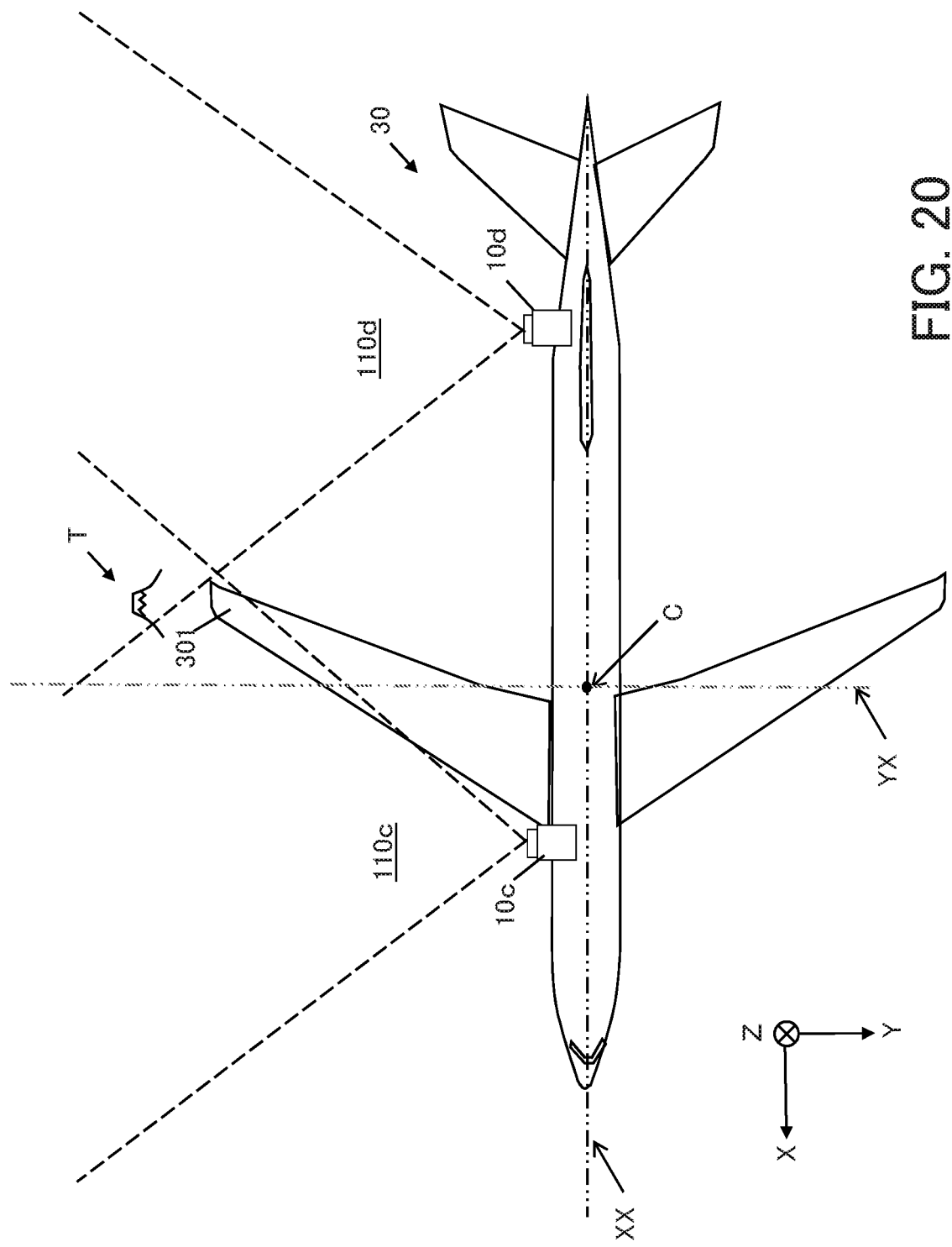
FIG. 20 is a simplified view of a camera layout example in a modification example.

As shown in FIG. 20, the two cameras 10c and 10d disposed flanking the main wing 301 are disposed so that the main wing 301 is included in the imaging range 110c of the front camera 10c, and the main wing 301 is not included in the imaging range 110d of the rear camera 10d. Again with this camera layout, just as with the example shown in FIG. 18, even if there is a portion of the video of the camera 10c that is hidden by the main wing 301, that can be compensated for by the video of the camera 10d when the videos are combined.

Modification Example 2

Figure 21:
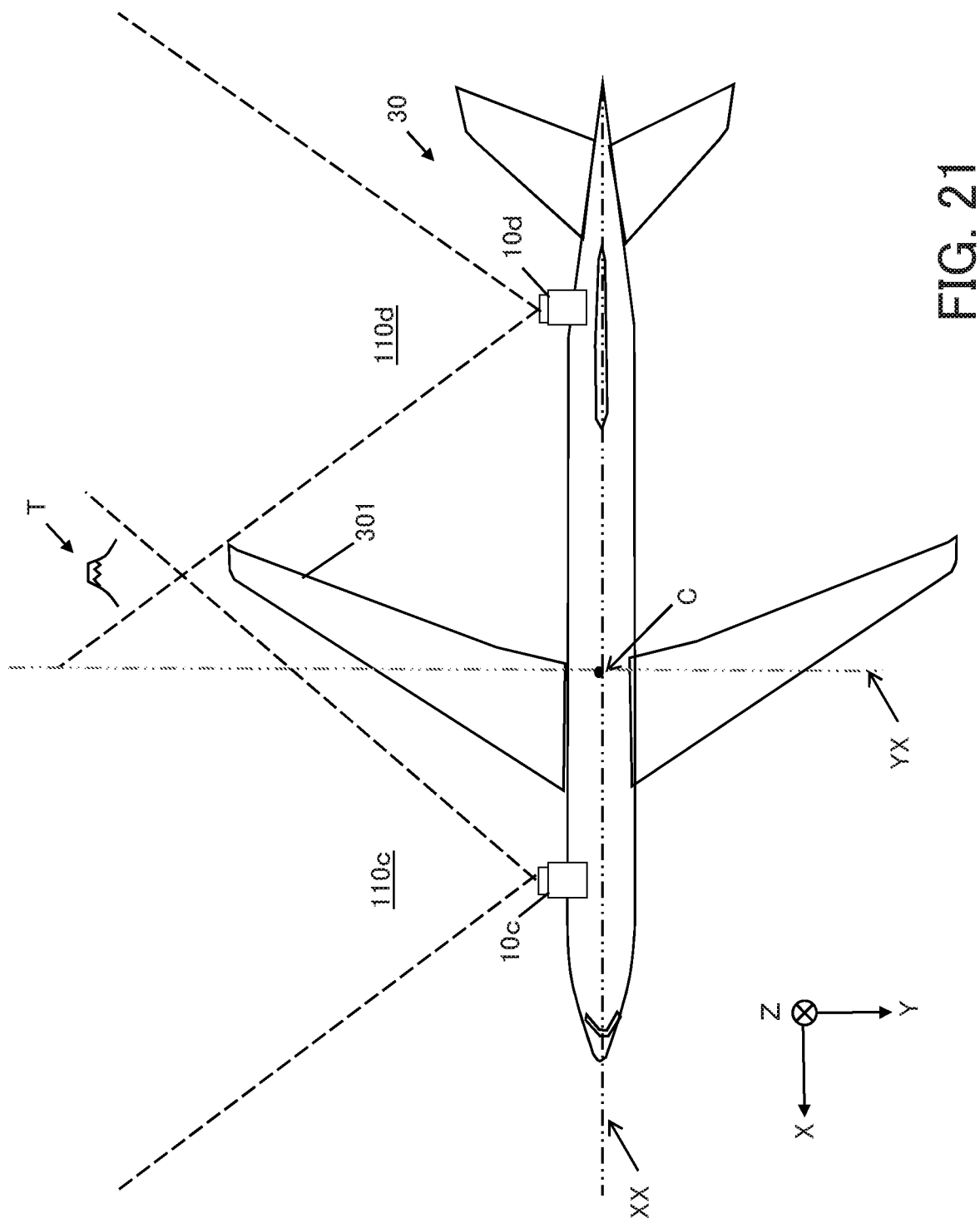
FIG. 21 is a simplified view of a camera layout example in another modification example.

As shown in FIG. 21, the two cameras 10c and 10d disposed flanking the main wing 301 may be disposed so that the main wing 301 is not included in either the imaging range 110c of the camera 10c or the imaging range 110d of the camera 10d. Again with this camera layout, a combined video can be obtained with a wide imaging range that covers both of the two imaging ranges 110c and 110d.

Embodiment 7

Figure 22:
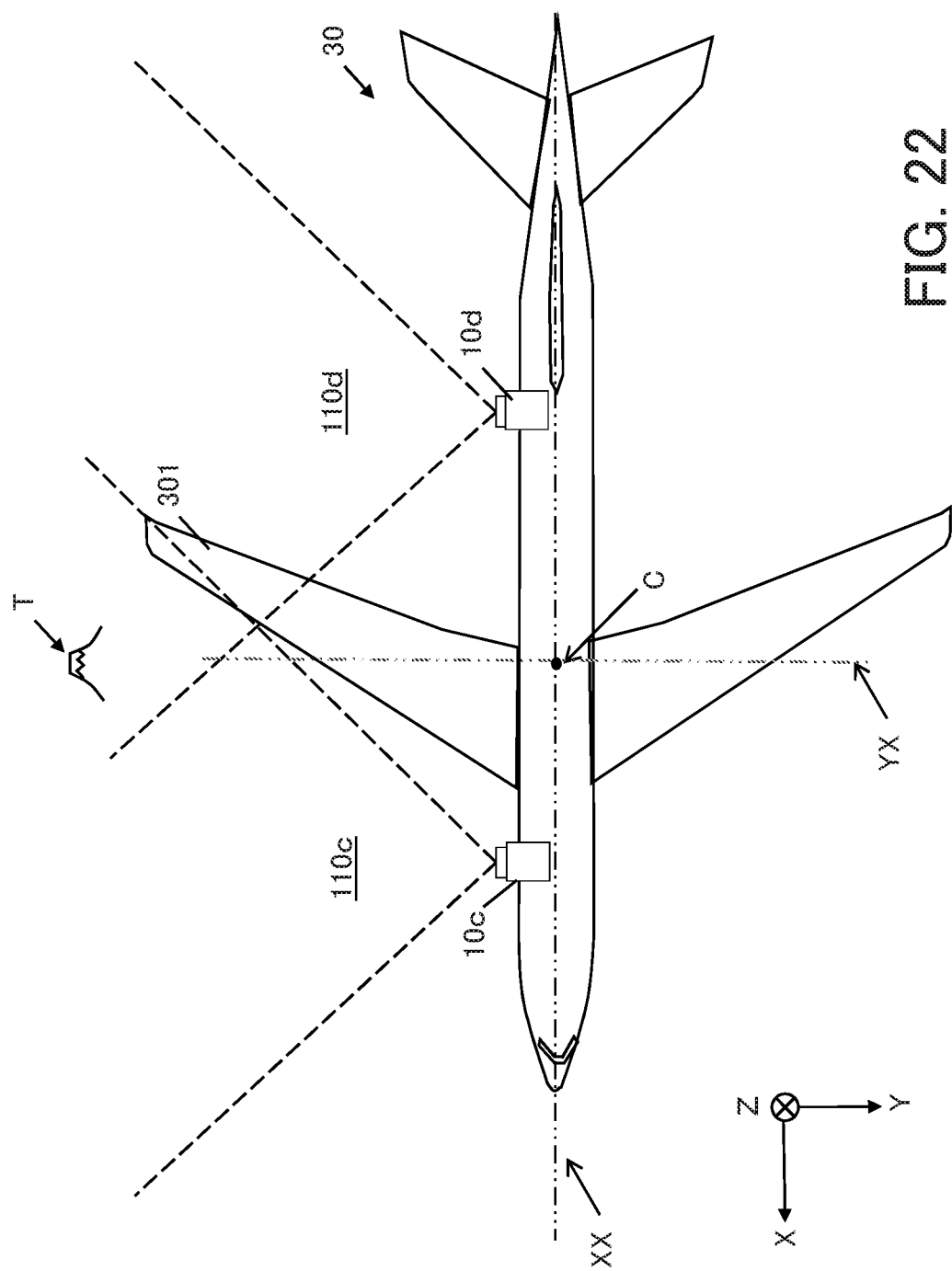
FIG. 22 is a simplified view of an example of the layout of a plurality of cameras flanking the main wing in Embodiment 7.

FIG. 22 shows another example of the layout of the two cameras 10c and 10d that flank the main wing 301. In this embodiment, the cameras 10c and 10d are disposed so that the main wing 301 is included in both the image range 110c of the camera 10c and the image range 110d of the camera 10d. The rest of the layout is the same as in Embodiment 6.

A layout such as this makes possible the following image processing, for example.

The relative positions of the main wing 301 and the cameras 10c and 10d are constant. Thus, the two images obtained from the cameras 10c and 10d can be easily combined by using any point on the main wing 301 as a combination reference.

More specifically, the combination of the images of the camera 10c and the camera 10d is executed by stitching processing, which is executed by the image processor 613 (FIG. 17; an example of a controller) of the server device 60 (FIG. 16) described in Embodiment 5 above. The image processor 613 of the server device 60 stitches the two images of the camera 10c and the camera 10d to a single image according to the combination reference. At this point, since the main wing 301 is included in both of the images of the camera 10c and the camera 10d, the two images can be easily combined if any point on the main wing 301 is set as the combination reference.

Embodiment 8

This embodiment relates to an example of selecting video that is good and covers a wide imaging range and providing this video to a passenger, when a plurality of camera units (three or more camera units) are installed aligned in the direction of travel of the aircraft.

Figure 23:
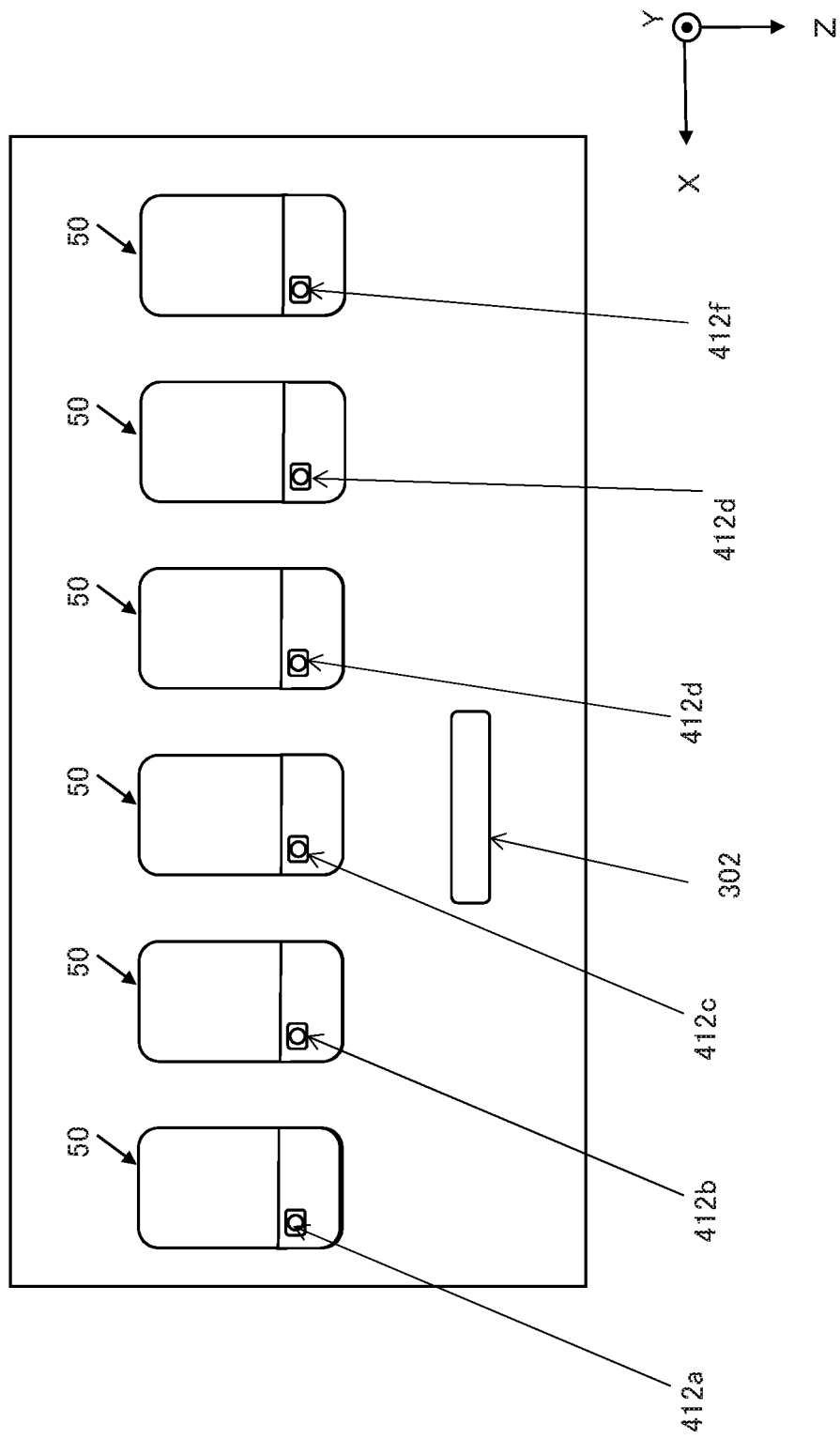
FIG. 23 is a simplified view of a configuration in which a plurality of camera units are attached to a plurality of windows in Embodiment 8.

FIG. 23 is a simplified view of the state when camera units 412a to 412f (an example of imaging devices) are attached to a plurality of the windows 50 of the airframe in the travel direction (the X axis direction). When video of outside the aircraft is captured, a good effect in which video is acquired over a wider range can be obtained by using video captured by the camera unit 412a, which is at the very front in the travel direction of the aircraft, and video captured by the camera unit 412f, which is located at the very rear. However, there are situations in which good video cannot be acquired, depending on the state of the camera units (whether the power is on or off, whether there is any malfunction, etc.), obstacles in front of the cameras, scratches on the window glass, the presence of abnormalities in the images of the camera unit, the positions of the camera units, and so forth. In view of this, in this embodiment good video over a wide range is acquired by selecting the plurality of camera units 412a to 412f on the basis of specific conditions.

Configuration

Figure 24:
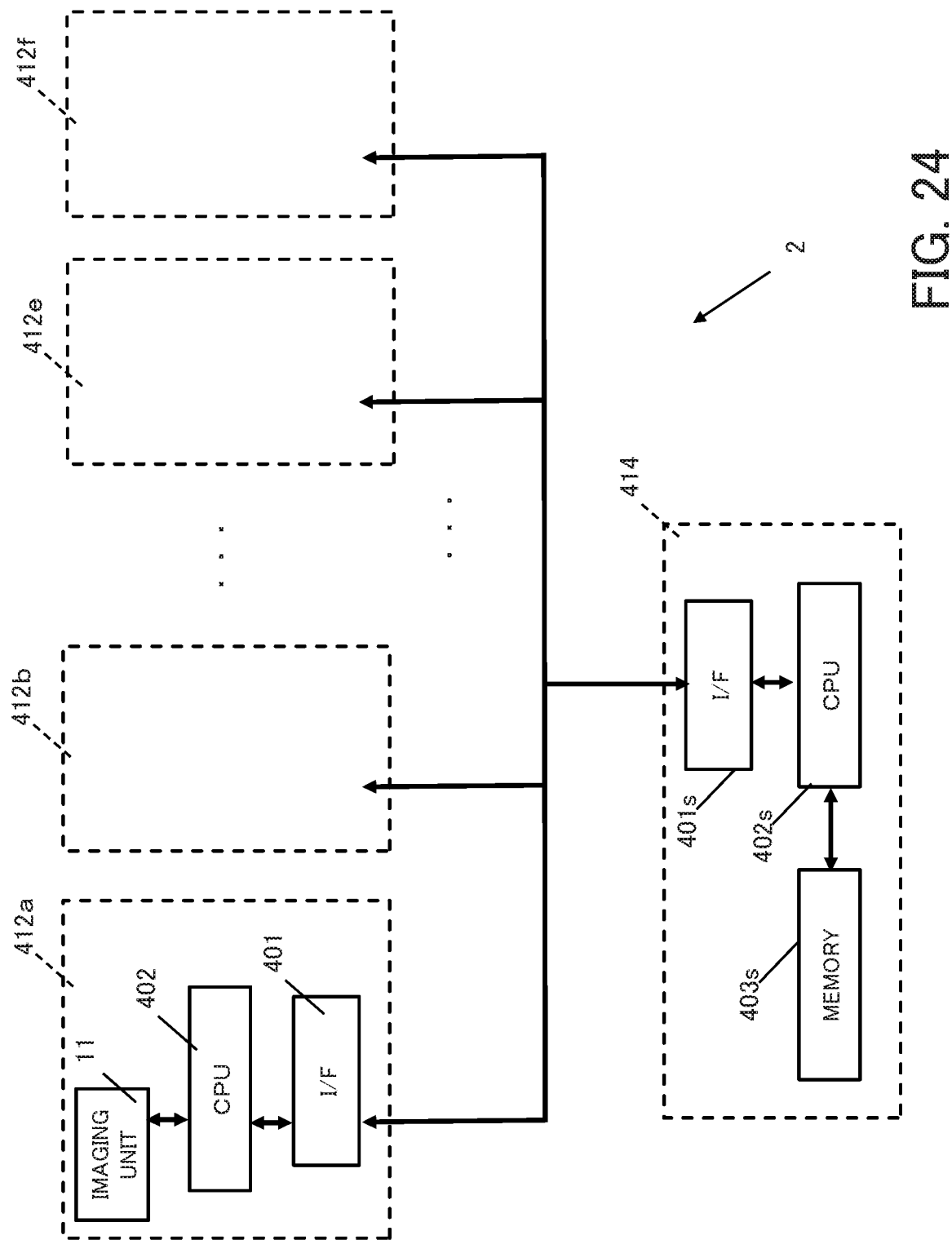
FIG. 24 is a block diagram of a system configuration example when using a plurality of camera units in Embodiment 8.

FIG. 24 is a block diagram of an example of the configuration of a video processing system 2 pertaining to this embodiment (an example of a video processing system). The configuration of the video processing system 2 will be discussed below.

The video processing system 2 comprises the camera units 412a to 412f and a server device 414 (an example of a control device) that is connected to the camera units 412a to 412f.

The camera units 412a to 412f each have an imaging unit 11 that includes a lens and an imaging element, a CPU 402, and an interface 401. The CPUs 402 each transmit self-diagnostic results for the camera units 412a to 412f, and the images captured by the camera units 412a to 412f, to the server device 414 through the interface 401. The imaging units 11 may be the same as the imaging unit 11 shown in FIG. 3, and the CPUs 402 and the interfaces 401 may be the same as the CPU 402 and the interface 401 of the controller 40 shown in FIG. 3. The self-diagnosis done by the camera units 412a to 412f is performed on the basis of the state of the camera units, obstacles in the imaging range, position information about the camera units, the determination of abnormality in the acquired images, and so forth.

The server device 414 is a computer device that comprises an interface 401s, a CPU 402s, and a memory 403s. The CPU 402s determines which of the images captured by the camera units 412a to 412f to use, on the basis of information about the positions where the camera units 412a to 412f are attached. The server device 414 may correspond to the server device 60 shown in FIGS. 15 and 16, the interface 401s may correspond to the communication interface, the CPU 402s may correspond to the CPU 61, and the memory 403s may correspond to the hard disk drive 62, the RAM 63, and/or the ROM 64. The server device 414 performs combination processing, such as the same stitching processing as in Embodiment 5, on the selected video, and outputs the combined image to be displayed on the display devices used by the passengers in the aircraft.

The example given here was one in which there were six of the camera units 412a to 412f, but any number of these may be used.

The captured images acquired from the camera units 412a to 412f may be such that all of the captured images from the camera units 412a to 412f are transmitted at once to the server device 414 and then selected or discarded by the server device 414, or just the selected captured images from the camera units 412a to 412f may be transmitted to the server device 414.

In this embodiment, as will be discussed below, an example is given of selecting among the videos of the camera units 412a to 412f on the basis of information about the self-diagnosis results for the camera units 412a to 412f, but this is not the only option. For example, captured images may first be received by the server device 414 from all of the camera units 412a to 412f, and which of the videos from the camera units 412a to 412f to select may be determined on the basis of the state of the cameras, camera position information, and a determination of the acquired video.

The selection of the video may be such that it is determined whether there is an abnormality in the video from the distribution of brightness in the acquired video, etc., and if it is determined that there is an abnormality, that video is not selected. A white flaw is an example of the cause of a video abnormality. It is known that in an aircraft flying through the sky, images can be adversely affected by white flaws on the imaging element caused by cosmic rays. Therefore, video from any camera units in which video defects have been caused by white flaws or the like is excluded from selection.

Also, if the view outside the aircraft cannot be captured completely due to an obstacle in front of the camera unit (such as the main wing or clouds), a determination is made on the basis of the video, position information about the camera units, etc., and video from said camera units is excluded from selection.

It is thus possible to acquire external video more effectively by excluding any camera unit whose imaging range has been narrowed by an obstacle or a flaw in the video, and selecting the video of other camera units. Furthermore, in this embodiment, if there are a plurality of videos of selected camera units, video that covers a wider imaging range and has good video quality can be acquired by selecting the two camera units that are farthest apart in the travel direction of the aircraft, as discussed below.

Operation

Figure 26:
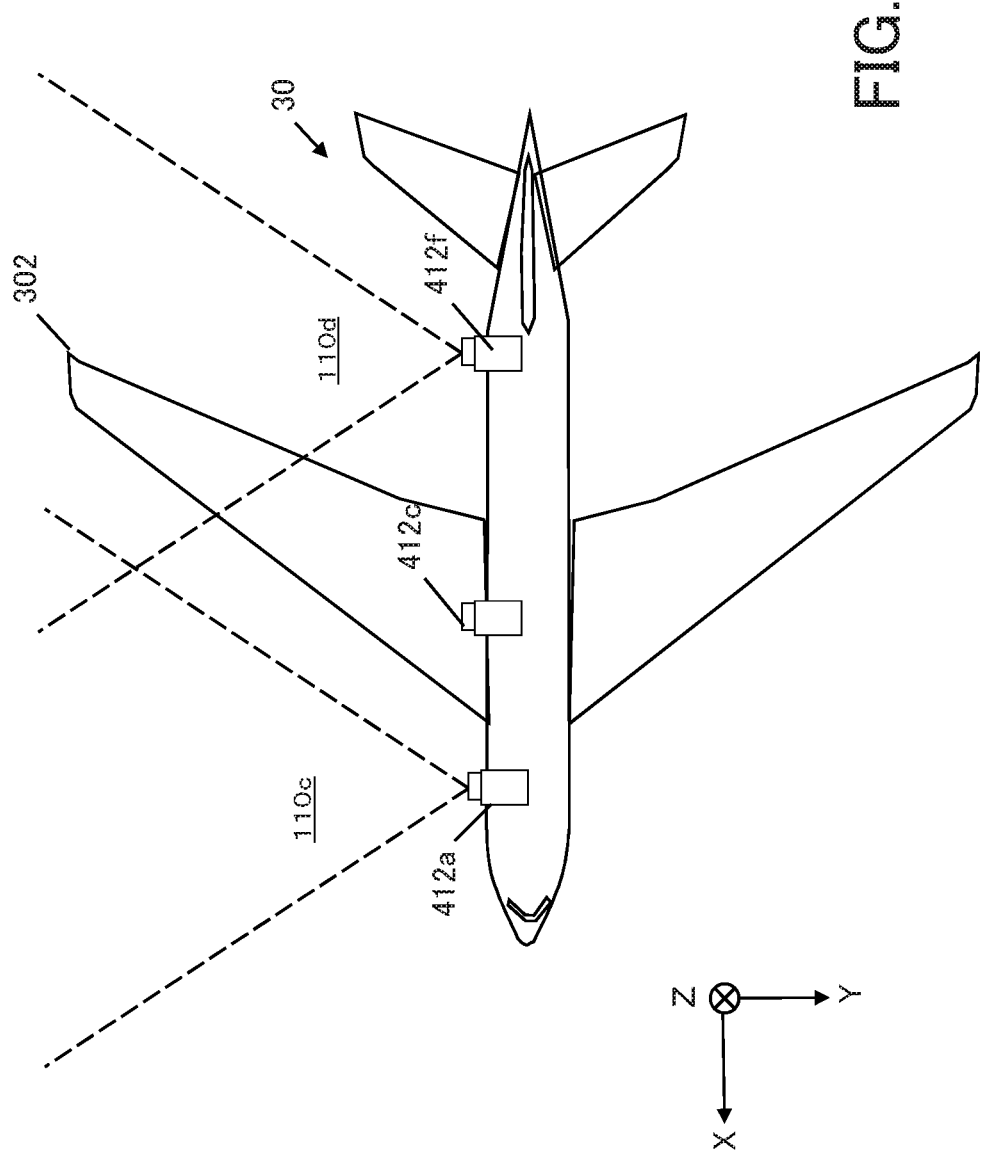
FIG. 26 is a simplified view of how a plurality of camera units are installed for capturing the view outside the aircraft in Embodiment 8.

An example of a specific method for selecting video will now be described through reference to FIGS. 25 and 26. Let us assume that among the camera units 412a to 412f, the camera unit 412a is the one closest to the front of the aircraft, and the camera unit 412f is the one closest to the rear. Let us also assume that the camera unit 412c is at the base of the main wing 302 as shown in FIG. 26, and that the main wing 302 poses an obstacle to external imaging. Thus, in states 1 to 3 described below, the camera unit 412c is excluded from selection because the external view cannot be fully captured due to the main wing 302.

In state 1 shown in FIG. 25, all of the camera units 412a to 412f are operating properly, and the external view can be captured without problem. Thus, the CPU 402s of the server device 414 selects the video of the camera unit 412a that is closest to the front and the video of the camera unit 412f that is closest to the rear. That is, the videos of the camera units 412a and 412f that are the farthest apart are selected.

In state 2, the camera units 412a, 412e, and 412f have problems with capturing the external view because of an abnormality in the video or clouds, whereas the camera units 412b and 412d have no abnormality in their video, and there is no problem with capturing the external view due to clouds. In this case, the CPU 402s of the server device 414 selects the video of the camera unit 412b at the front and the video of the camera unit 412d at the rear, which have no problems with capturing video. That is, in state 2, there are only two camera units (412b and 412d) without any problems with capturing video, so these videos are selected.

In state 3, the camera units 412a and 412b either have an abnormality in their video or the view of the outside is obscured by clouds, while the camera units 412d to 412f have no video abnormality nor any problem with the view of the outside being obscured by clouds. Thus, in state 3, the CPU 402s of the server device 414 selects the video of the camera unit 412d (the closest to the front) and the video of the camera unit 412f (the closest to the rear) out of the remaining camera units 412d to 412f that have no problems with capturing video. That is, the videos of the camera units 412d and 412f, which are the farthest apart out of the camera units 412d to 412f that have no problems with capturing video, are selected.

As discussed above, with the video processing system 2 pertaining to Embodiment 8, and the video processing method executed by this system, videos are selected on the basis of specific conditions from among the videos captured with the camera units 412a to 412f, and of those selected camera units, the videos are selected from the camera units that are disposed the farthest apart. Thus, when the selected videos are combined by stitching processing or the like, the resulting combined video will be of good quality and will cover a wide imaging range.

Modification Example

Figure 27:
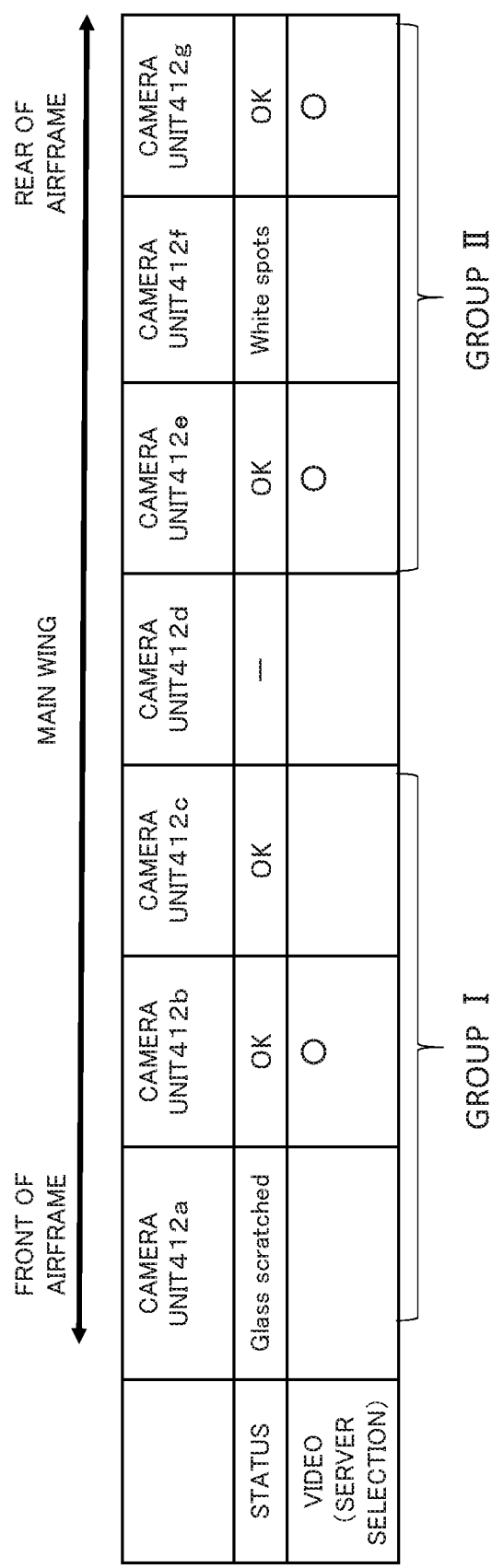
FIG. 27 is a simplified view of the imaging state and video selection when using a plurality of camera units in a modification example of Embodiment 8.

In Embodiment 8, the camera video on the front side of the main wing 302 in the travel direction of the aircraft and the camera video on the rear side may be selected. More specifically, as shown in FIG. 27, the camera units 412*a* to 412*g* are divided into a group I consisting of the camera units 412*a* to 412*c* on the front side of the main wing 302, and a group II consisting of the camera units 412*e* to 412*g* on the rear side. In this example, the camera unit 412*d* is excluded from selection since the main wing 302 prevents it from fully capturing a view of the outside of the aircraft.

The CPU 402*s* of the server device 414 selects good video from among the videos acquired from the camera units of group I, and selects the video obtained from the camera unit that is closest to the front or that is the farthest away from group II. In the example in FIG. 27, the video from the camera unit 412*b* is selected. Meanwhile, the CPU 402*s* selects good video from among the videos acquired from the camera units of group II, and selects the video obtained from the camera unit that is closest to the rear or that is the farthest away from group I. In the example in FIG. 27, the video from the camera unit 412*g* is selected.

With the above-mentioned video processing system 2, and the video processing method executed by this system, good video that covers a wide range, flanking the main wing 302, can be provided.

Other Embodiments

Embodiments were described above as examples of the technology disclosed in this application. However, the technology disclosed herein is not limited to these, and can also be applied to embodiments with modifications, substitutions, additions, omissions, and so forth made as needed. Examples of other embodiments are given below.

(1)

In Embodiments 6 and 7 above, an example was described in which the two cameras 10*c* and 10*d* were disposed on one side of the aircraft 30 along the X axis XX (roll axis), but this may be changed to just one camera. In this case, a wider imaging range can be used by expanding the angle of view of the camera.

Also, the cameras 10*c* and 10*d* were disposed on one side of the aircraft 30 along the X axis XX, but cameras may also be disposed in the same way on the other side.

Furthermore, three or more cameras may be disposed on one or both sides of the aircraft 30 along X axis XX (roll axis).

(2)

In Embodiments 6 and 7 above, the relative positions of the two cameras 10*c* and 10*d* with respect to the main wing 301 may be set not just by changing their layout, but also by adjusting their angle of view or orientation. That is, the angle of view or orientation of each camera may be set so that the main wing 301 is included in the imaging range, or may be set so that the main wing 301 is not included in the imaging range.

(3)

In Embodiment 8 above, video was selected on the basis of specific conditions from among the video captured by the camera units 412*a* to 412*f*, and the videos of the camera units disposed the farthest apart were selected from among these selected camera units 412*a* to 412*f*, but this is not the only option. The configuration may be such that if two or fewer camera units are selected on the basis of the specific conditions, then the video of those camera units is selected.

(4)

In the above embodiments, an aircraft was used as an example of where the cameras are installed, but this is not the only option, and they may instead be installed in an automobile, a train, a ship, or some other means of transportation.

The invention claimed is:

1. A video processing system, comprising:
an imaging system comprising a plurality of imaging devices installed in an airframe of an aircraft having a main wing and disposed flanking the main wing, each of the plurality of imaging devices having an imaging range, the plurality of imaging devices disposed so that the imaging ranges overlap an extension of a pitch axis of the aircraft and do not overlap a roll axis of the aircraft or an extension thereof; and
a control device configured to be connected to the imaging system, wherein the control device
selects two or more imaging devices from the plurality of imaging devices based on a specific condition,
combines images from the two or more imaging devices that have been selected, and
outputs the combined image; and
wherein when the two or more imaging devices are three or more imaging devices, the control device selects two imaging devices that are farthest apart from among the three or more imaging devices, combines images from the selected two imaging devices, and outputs the combined image.

2. The video processing system of claim 1, wherein the specific condition includes at least one of: states of the imaging devices; whether or not there is an obstacle within the imaging range of the imaging devices; whether or not there is an abnormality in the images from the imaging devices; and positions of the imaging devices.

3. The video processing system of claim 1, wherein at least part of the imaging range of one of the plurality of imaging devices overlaps the imaging range of another one of the plurality of imaging devices.

4. The video processing system of claim 1, wherein some of the plurality of imaging devices are disposed so as to be parallel to each other in a plane that includes their respective optical axes.

5. The video processing system of claim 1, wherein the plurality of imaging devices are disposed so that the main wing of the aircraft is included in the imaging range of one of the plurality of imaging devices, and the main wing of the aircraft is not included in the imaging range of another one of the plurality of imaging devices.

6. A video processing system, comprising:
an imaging system comprising a plurality of imaging devices installed in an airframe of an aircraft having a main wing and disposed flanking the main wing, each of the plurality of imaging devices having an imaging range, the plurality of imaging devices disposed so that the imaging ranges overlap an extension of a pitch axis of the aircraft and do not overlap a roll axis of the aircraft or an extension thereof; and
a control device configured to be connected to the imaging system, wherein the control device
selects two or more imaging devices from the plurality of imaging devices based on a specific condition,
combines images from the two or more imaging devices that have been selected, and
outputs the combined image; and
wherein the two or more imaging devices include an imaging device that is farthest away from the main wing among a first group of imaging devices and an imaging device that is farthest away from the main wing among a second group of imaging devices, the first group disposed at a front of the aircraft with respect to the main wing, the second group disposed at a rear of the aircraft with respect to the main wing.

7. The video processing system of claim 6, wherein the specific condition includes at least one of: states of the imaging devices; whether or not there is an obstacle within the imaging range of the imaging devices; whether or not there is an abnormality in the images from the imaging devices; and positions of the imaging devices.

8. The video processing system of claim 6, wherein at least part of the imaging range of one of the plurality of imaging devices overlaps the imaging range of another one of the plurality of imaging devices.

9. The video processing system of claim 6, wherein some of the plurality of imaging devices are disposed so as to be parallel to each other in a plane that includes their respective optical axes.

10. The video processing system of claim 6, wherein the plurality of imaging devices are disposed so that the main wing of the aircraft is included in the imaging range of one of the plurality of imaging devices, and the main wing of the aircraft is not included in the imaging range of another one of the plurality of imaging devices.

11. A video processing method using an imaging system including a plurality of imaging devices disposed in an airframe of an aircraft flanking a main wing of the aircraft, the imaging devices being disposed so that imaging ranges of the imaging devices overlap an extension of a pitch axis of the aircraft and do not overlap a roll axis of the aircraft or an extension thereof, said method comprising:
  selecting two or more of the imaging devices based on a specific condition;
  combining images from the two or more imaging devices that have been selected; and
  outputting the combined image;
  wherein when the two or more imaging devices are three or more imaging devices, said selecting comprises selecting two imaging devices that are farthest apart from among the three or more imaging devices, said combining comprises combining images from the selected two imaging devices, and said outputting comprises outputting the combined image.

12. The video processing method according to claim 11, wherein the specific condition includes at least one of: states of the imaging devices; whether or not there is an obstacle within the imaging range of the imaging devices; whether or not there is an abnormality in the images from the imaging devices; and positions of the imaging devices.

13. A video processing method using an imaging system including a plurality of imaging devices disposed in an airframe of an aircraft flanking a main wing of the aircraft, the imaging devices being disposed so that imaging ranges of the imaging devices overlap an extension of a pitch axis of the aircraft and do not overlap a roll axis of the aircraft or an extension thereof, said method comprising:
  selecting two or more of the imaging devices based on a specific condition, and in said selecting, selecting an imaging device that is farthest away from the main wing among a first group of imaging devices and an imaging device that is farthest away from the main wing among a second group of imaging devices, the first group disposed at a front of the aircraft with respect to the main wing, the second group disposed at a rear of the aircraft with respect to the main wing;
  combining images from the two or more imaging devices that have been selected; and outputting the combined image.

14. The video processing method according to claim 13, wherein the specific condition includes at least one of: states of the imaging devices; whether or not there is an obstacle within the imaging range of the imaging devices; whether or not there is an abnormality in the images from the imaging devices; and positions of the imaging devices.

\* \* \* \* \*